United States Patent

Hable et al.

[11] Patent Number: 5,823,455
[45] Date of Patent: Oct. 20, 1998

[54] BELT-DRIVEN DATA STORAGE DEVICE WITH CORNER ROLLER ASSEMBLIES PRESELECTED TO HAVE DIFFERENT DRAG FORCE PROFILES

[75] Inventors: Mary R. Hable, Stillwater; Mark R. Larson, Oakdale; Kam W. Law, Woodbury, all of Minn.

[73] Assignee: Imation Corp., Oakdale, Minn.

[21] Appl. No.: 771,177

[22] Filed: Dec. 20, 1996

[51] Int. Cl.⁶ .......................... G11B 23/087; G11B 23/04; G11B 15/32

[52] U.S. Cl. ...................... 242/340; 242/342; 242/352.4; 360/132; 360/96.3

[58] Field of Search .................................. 242/340, 342, 242/346.2, 352.4; 360/96.3, 132

[56] References Cited

U.S. PATENT DOCUMENTS

| | | | |
|---|---|---|---|
| 3,692,255 | 9/1972 | Von Behren | 242/192 |
| 3,787,351 | 1/1974 | Olson | 260/40 |
| 3,810,874 | 5/1974 | Mitsch et al. | 260/75 |
| 3,848,265 | 11/1974 | Biery et al. | 360/132 |
| 4,094,911 | 6/1978 | Mitsch et al. | 260/615 |
| 4,267,238 | 5/1981 | Chernega | 428/422 |
| 4,268,556 | 5/1981 | Pedrotty | 428/65 |
| 4,406,801 | 9/1983 | Onopchenko et al. | 252/46.7 |
| 4,472,290 | 9/1984 | Caporiccio et al. | 252/51.5 |
| 4,507,214 | 3/1985 | Aldorf | 252/18 |
| 4,581,189 | 4/1986 | Smith et al. | 264/131 |
| 4,675,452 | 6/1987 | Lagow et al. | 568/601 |
| 4,711,523 | 12/1987 | Iri et al. | 350/96.23 |
| 4,724,092 | 2/1988 | Fukui et al. | 252/54 |
| 4,746,575 | 5/1988 | Scarati et al. | 428/421 |
| 4,757,145 | 7/1988 | Caporiccio et al. | 546/81 |
| 4,795,764 | 1/1989 | Alm et al. | 521/107 |
| 5,093,432 | 3/1992 | Bierschenk et al. | 525/331.6 |
| 5,448,440 | 9/1995 | Law et al. | 360/132 |
| 5,494,596 | 2/1996 | Law et al. | 252/54 |

FOREIGN PATENT DOCUMENTS

| | | | |
|---|---|---|---|
| 0 211 237 A1 | 2/1987 | European Pat. Off. | G11B 23/50 |
| 0 373 884 A3 | 6/1990 | European Pat. Off. | G11B 23/87 |
| 0 426 440 A2 | 5/1991 | European Pat. Off. | G11B 5/72 |
| 58-155566 | 9/1983 | Japan | G11B 15/60 |
| 1026021 | 1/1989 | Japan | F16C 33/10 |
| 2158977 | 6/1990 | Japan | G11B 23/897 |
| Hei 6-111523 | 4/1994 | Japan | G11B 23/87 |
| 2114953 | 9/1983 | United Kingdom | G11B 23/08 |

OTHER PUBLICATIONS

Verbatim TR–1 EXTRA Minicartridge, Verbatim Corporation 1996 (one xeroxed page of an advertisement and one polariod snapshot of cartridge).

Mechanical Design of a Belt–Driven Data Cartridge, Robert A. von Behren et al., Adv. Info. Storage Syst., vol. 1, 1991, pp. 49–59.

Primary Examiner—John Q. Nguyen
Attorney, Agent, or Firm—Eric D. Levinson

[57] ABSTRACT

Using corner roller assemblies with different drag force profiles provides improved control in establishing tape tension characteristics of a belt-driven tape cartridge. The belt driven tape cartridge has a tape tension profile and is of the type comprising first and second corner roller assemblies defining a portion of a drive belt path of a cartridge. The first corner roller assembly has a first drag force profile and includes a first shaft and a first rotating member comprising a first bore. The first rotating member is rotatably mounted on the first shaft, such that the first shaft is disposed in the first bore. The second corner roller assembly has a second drag force profile and includes a second shaft and a second rotating member comprising a second bore. The second rotating member is rotatably mounted on the second shaft, such that the second shaft is disposed in the second bore. The first and second corner roller assemblies are configured such that the drag force profile of the first corner roller assembly is preselected to be different from the drag force profile of the second corner roller assembly in order to totally establish the tape tension of the cartridge.

26 Claims, 11 Drawing Sheets

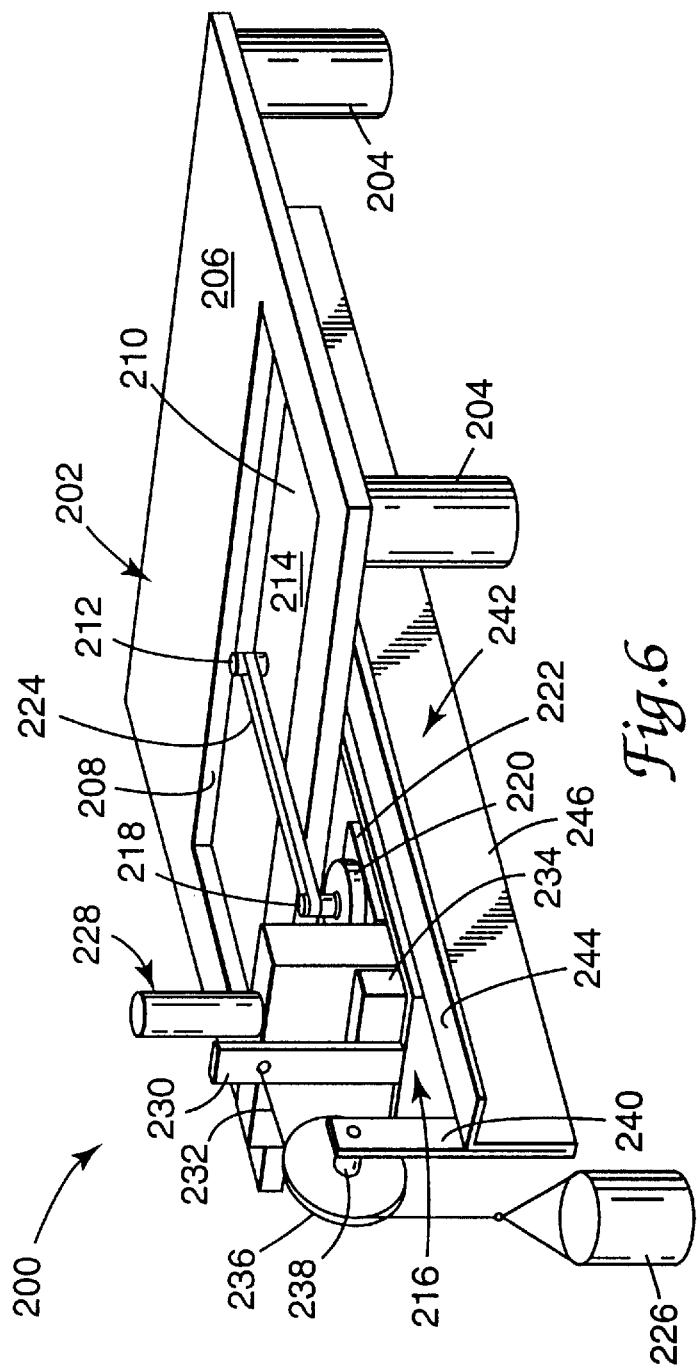

BELT-DRIVEN DATA STORAGE DEVICE WITH CORNER ROLLER ASSEMBLIES PRESELECTED TO HAVE DIFFERENT DRAG FORCE PROFILES

FIELD OF THE INVENTION

This invention is in the field of belt-driven magnetic recording tape cartridges such as are described in U.S. Pat. No. 3,692,255 (Von Behren). More specifically, this invention relates to an improved corner roller lubricant system for such belt-driven magnetic recording tape cartridges.

BACKGROUND OF THE INVENTION

The belt-driven tape cartridges of the Von Behren patent, U.S. Pat. No. 3,692,255, incorporated herein by reference, are commonly referred to as "data cartridges." A data cartridge typically includes a housing defining a thin, generally rectangular enclosure. The housing contains a length of magnetic recording tape which is wound upon a pair of tape reel hubs. The magnetic recording tape is driven by an elastomeric drive belt which, in turn, is driven by a single, reversible drive motor. The drive belt provides rapid acceleration and deceleration of the recording tape in either direction. The drive belt is stretched along a drive belt path generally defined by a drive roller, a pair of corner roller assemblies, and part of the tape pack wound on each hub. Each corner roller assembly generally includes a shaft, a rotatable corner roller mounted on the shaft for free-wheeling rotation, and desirably a lubricant provided at the interface between the shaft and its corresponding corner roller.

A data cartridge is designed so that the tape, driven by the drive belt, is under a certain amount of tension at all times during operation of the data cartridge. The tape tension must not fall below a certain minimum level as the tape passes from hub to hub or else contact between a read/write head (also referred to as a transducer head) and the tape may be insufficient to allow successful data transfer. Conversely, the maximum drive force, i.e., the force which must be applied to rotate the cartridge drive roller, must not exceed the power rating of the motor in the associated drive. In short, data cartridges must meet minimum tape tension specifications while simultaneously operating within maximum allowable drive force specifications to achieve acceptable performance of a data cartridge in a drive. Meeting both specifications may be difficult, especially since drive force is at least partially dependent on tape tension, meaning that an increase in tape tension has the effect of increasing drive force.

It is well known that tape tension and drive force in a belt-driven data cartridge are a function of the drag force, i.e., frictional force, exerted by each of the corner roller assemblies. Thus, friction (drag) which occurs at the interface between the corner roller bodies and their shafts will help tension the tape so that the tape can interface properly with the read/write head in the drive. It has been demonstrated that the total drag force provided by both corner roller assemblies in a belt-driven data cartridge is the sum of the drag force exerted by each individual corner roller assembly. See von Behren et al., "Mechanical Design of a Data Cartridge", *Adv. Info. Storage Sys.* (1991) at 1.

As the demand for higher recording densities and faster tape transport speeds in data cartridges continues to increase, maintaining precise control over the uniformity of corner roller drag force is critical to enhancement of record/playback performance. This is a challenge, though, because the drag force exerted by a corner roller assembly may be affected by many variables, but is particularly dependent upon the viscosity characteristics of the lubricant incorporated into the corner roller assembly. Ideally, therefore, it would be desirable to use a corner roller lubricant whose viscosity characteristics are extremely stable over the full operating range of a data cartridge.

Unfortunately, most lubricants by themselves do not satisfy this desire. It is well known that the viscosity characteristics of the known classes of corner roller lubricants tend to vary with changes not only in temperature, but also with changes in tape transport speed. Therefore, it has been, and will continue to be desirable, to develop lubricants for corner roller assemblies which can be used to reduce the dependency of tape tension and drive force upon changes in temperature and/or speed. Finding a particular lubricant that satisfies demands simultaneously has been difficult, however.

For example, U.S. Pat. No. 5,448,440 describes a corner roller lubricant which includes a synthetic hydrocarbon base oil, fluorinated resin particles which function as a thickener, and a dispersant to help disperse the particles in the base oil. These lubricants tend to provide a corner roller assembly with reasonably stable drag force profiles over a wide range of operating speeds. However, the drag force of these lubricants tends to increase somewhat with increasing tape speeds. More significantly, these lubricants are relatively sensitive to changes in temperature. Certainly, it would be desirable to reduce both the temperature and speed dependence of such lubricants.

U.S. Pat. No. 5,494,596 describes a lubricant which includes a linear, nonpolar, perfluoropolyether base oil and fluorinated resin particles which function as a thickening agent. These lubricants show remarkably stable drag force characteristics over a wide range of operating temperatures, but are relatively sensitive to changes in speed. Certainly, it would be desirable to find a way to reduce the speed dependence of these lubricants to take full advantage of the ability of these lubricants to function so well over broad temperature ranges.

In short, to further optimize data cartridge performance, it is extremely desirable to maintain uniform minimum tape tension and operate within specified drive force parameters during recording and playback. Changes in temperature and/or speed, for example, may cause tape tension and drive force characteristics to vary considerably. This variability may lead to undesirable consequences such as stalling of the drive at low operating temperatures and/or speeds or insufficient tape tension at high operating temperatures and/or speeds. Therefore, reducing the temperature and speed dependence of tape tension and drive force characteristics will improve data cartridge performance.

SUMMARY OF THE INVENTION

The present invention provides an improved lubrication approach which can be used with any class, or classes of lubricants to provide a belt-driven data cartridge with more uniform tape tension and drive force characteristics over a wide range of speed and temperature conditions. According to the present invention, each corner roller assembly in a data cartridge is preselected to have a different drag force profile than the other in order to improve control over tape tension and drive force.

The present invention is based, in part, upon the appreciation that each corner roller assembly can be provided with a drag force profile that compliments the other assembly in a way that stabilizes tape tension and drive force. For example, if a particular corner roller assembly has a drag force profile which tends to provide low drag force at low speeds and high drag force at high speeds, the other corner roller assembly can be configured to have a complimentary profile characterized by high drag force at low speeds and low drag force at high speeds. In this way, the relatively high drag force values provided by one corner roller assembly are offset by the relatively low drag force values provided by the other corner roller assembly. Dynamic control is also possible. For example, if the drag force profile of one corner roller assembly tends to increase with speed over a given portion of a tape speed operating range, the other corner roller assembly can be provided with a drag force profile which tends to decrease over that portion of the tape speed operating range. Again, one profile offsets the other.

In sum, the use of two different corner roller assemblies allows overall tape tension and drive force profiles to be achieved which are more uniform than if both corner roller assemblies used in a data cartridge were to be identically configured, as is typical of the previously known cartridges. The improved tape tension and drive force control provided by our invention permits more precise contact between the tape and the transducer head during data transfer as tape speeds and operating temperatures vary widely. Enhanced contact between tape and transducer reduces lost data. The improved uniformity of tape tension also reduces head wear and helps reduce tape distortion as well. Because control over maximum drive force is also improved, power demands upon data cartridge drives are reduced. Such drives could, therefore, be made with smaller componentry and thereby be more compact, more efficient, and less costly.

The principles of the present invention are particularly advantageously applied to using lubricants of the type comprising linear, nonpolar, perfluoropolyether base oils. Pairs of such lubricants having complementary drag force profiles are readily identifiable, as well as being commercially available. Used individually, these lubricants demonstrate excellent stability with temperature changes, but are sensitive to speed changes. The present invention allows these lubricants to be used in a manner to provide a cartridge with tape tension and drive force properties having both low temperature and speed dependence.

In one aspect, the present invention relates to a belt driven tape cartridge having a tape tension profile and being of the type comprising first and second corner roller assemblies defining a portion of a drive belt path of the cartridge. The first corner roller assembly has a first drag force profile and includes a first shaft and a first rotating member comprising a first bore. The first rotating member is rotatably mounted on the first shaft, such that the first shaft is disposed in the first bore. The second corner roller assembly has a second drag force profile and includes a second shaft and a second rotating member comprising a second bore. The second rotating member is rotatably mounted on the second shaft, such that the second shaft is disposed in the second bore. The first and second corner roller assemblies are configured such that the drag force profile of the first corner roller assembly is preselected to be different from the drag force profile of the second corner roller assembly in order to controllably establish the tape tension of the cartridge.

In another aspect, the present invention relates to a method of providing a desired tape tension profile for a belt driven data storage device comprising first and second corner roller assemblies. According to the process, information representative of a plurality of drag force profile characteristics for a corresponding plurality of lubricants is provided. Such information is used in order to select a first lubricant capable of providing the first corner roller assembly with a first drag force profile and a second lubricant capable of providing the second corner roller assembly with a different, second drag force profile. The lubricants are selected in order to controllably establish the desired tape tension profile. The first lubricant is provided in the first corner roller assembly and the second lubricant is provided in the second corner roller assembly.

In still yet another aspect, the present invention provides a method for controlling the drive force in a belt driven tape cartridge of the type having an elastic belt, a base plate, and at least two corner rollers. The process includes the step of providing a first corner roller assembly which produces a first predetermined drag force profile and providing a second corner roller assembly which produces a second drag force profile different from the first drag force profile.

Because the drag force produced by a particular corner roller assembly tends to vary with speed, a speed dependency curve may be plotted for the corner roller assembly in which the drag force of the corner roller assembly is expressed as a function of speed. The resultant curve is referred to herein as a "drag force profile".

In the practice of the present invention, the term "molecular weight" with respect to any polymer, such as a perfluoropolyether base oil, refers to the weight average molecular weight of the polymer.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIG. 6 is a prospective view of one apparatus found to be suitable for measuring a drag force profile according to the practice of the present invention;

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
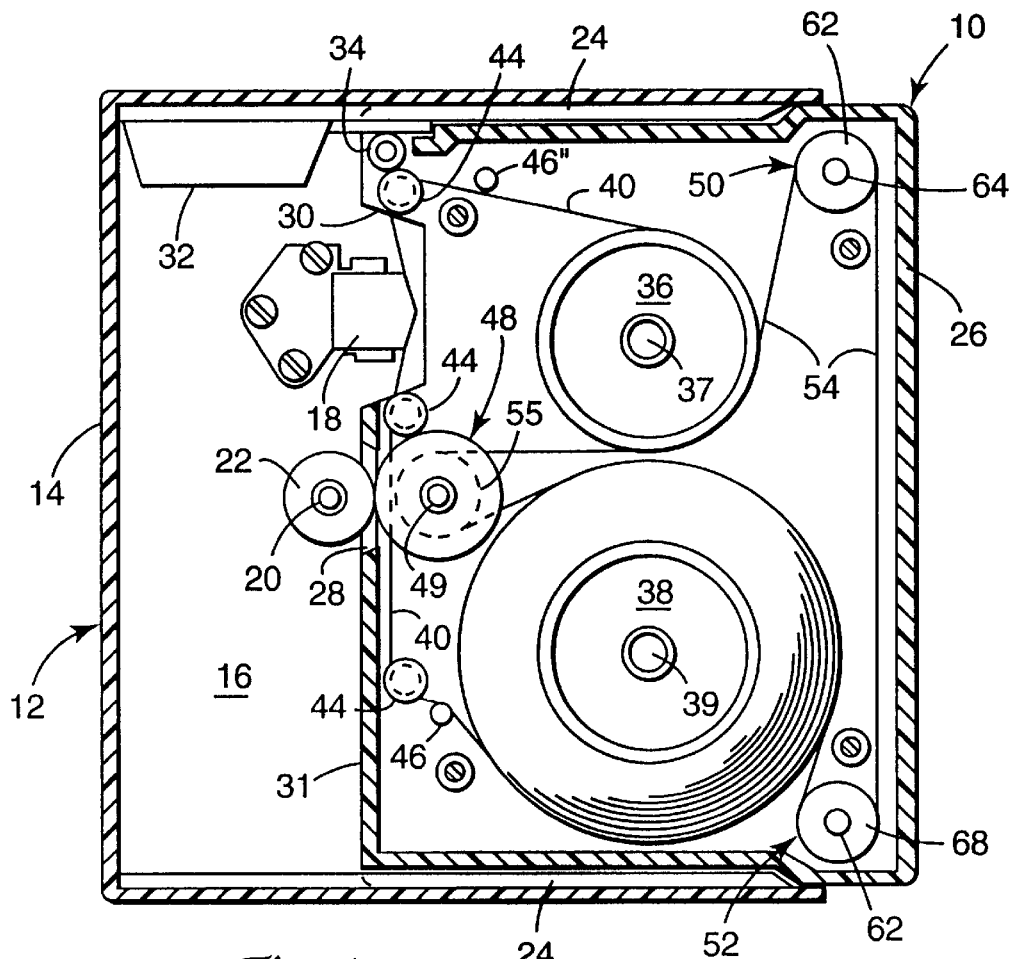
FIG. 1 is a broken-away top view of a tape cartridge inserted in a data cartridge drive.

FIG. 1 shows a data storage device, a belt-driven data cartridge 10, in which the tape tension and drive force characteristics of the cartridge may be controlled according to the principles of the present invention. Although the present invention will be described with reference to the particular belt driven data cartridge 10, the principles of the present invention can be incorporated into any other kind of belt driven tape cartridge or any other data storage device comprising at least two rotatable member assemblies whose drag force characteristics are desirably controlled relative to each other.

The cartridge 10 is shown engaged with a magnetic recording apparatus 12. As used herein, "magnetic recording apparatus" means an apparatus for recording or reproducing information that is stored on magnetic or optical recording tape. The magnetic recording apparatus 12 comprises a support frame 14 including a horizontal cartridge support deck 16 supporting a magnetic transducer head 18. The support deck 16 also supports, in a depending manner, a reversible drive motor (not shown), the shaft 20 of which extends through the support deck 16. A drive puck 22 is mounted on the shaft 20 above the support deck 16. Elongate guides 24 define the position of the cartridge 10 on the support deck 16.

The cartridge 10 includes a housing 26 which includes drive access means. In FIG. 1, drive access means comprises openings 28 and 30 which are located on one edgewall 31 of the housing 26. The opening 28 provides access for the drive puck 22. The opening 30 provides access for the transducer head 18. The opening 30 is covered by a door 32 (shown in the open position) which is biased by a torsion spring 34 towards a closed position covering the opening 30.

A pair of tape reel hubs 36 and 38 are rotatably mounted on shafts 37 and 39, respectively, on parallel axes inside housing 26. A length of magnetic recording tape 40 is wound on the hubs 36 and 38 such that a portion of the tape 40 extends from one hub to the other hub and across opening 30. Means for defining a tape path in the housing to guide the tape 40 from one hub to the other hub and across the opening 30 includes guides 44 and tape wrap pins 46. Means for defining a drive belt path includes a drive belt roller 48 rotatably mounted on a shaft 49, part of the tape 40 wound on each hub 36 or 38, and belt corner roller assemblies 50 and 52.

Drive belt 54 extends along the drive belt path such that the drive belt 54 frictionally engages a portion of the magnetic recording tape 40 to cause transport of the tape 40 from one hub to the other hub. The length of the unstretched drive belt 54 is less than the length of the drive belt path so that the belt 54 is stretched when inserted into the cartridge 10. The drive belt 54 of the invention may be made of any suitable elastomeric material, and is preferably configured as an endless belt. Examples of suitable elastomeric materials include polyurethanes, polyurethane polyethers, polyurethane polyesters, and combinations thereof.

When the cartridge 10 is engaged with the magnetic recording apparatus 12 as shown in FIG. 1, the drive puck 22 contacts the belt drive roller 48 through the opening 28, and the transducer head 18 contacts the tape 40 through the opening 30. A belt-contacting portion 55 of the drive belt roller 48 is recessed to permit the tape 40 to pass across the drive belt roller 48 without touching the drive puck 22. Cartridges such as cartridge 10 and their operation have been described in U.S. Pat. Nos. 3,692,255 and 4,581,189.

Figure 2:
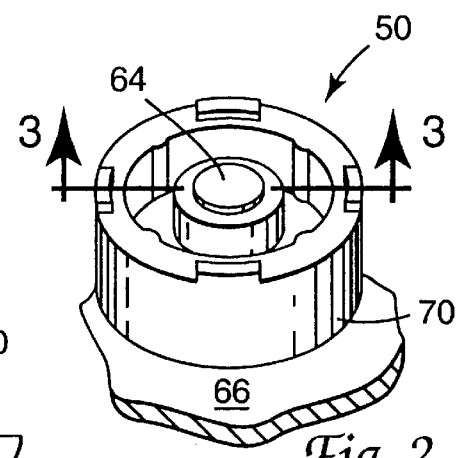
FIG. 2 is a perspective view of a portion of the inside of a data cartridge showing a corner roller mounted on a corner roller shaft.
Figure 3:
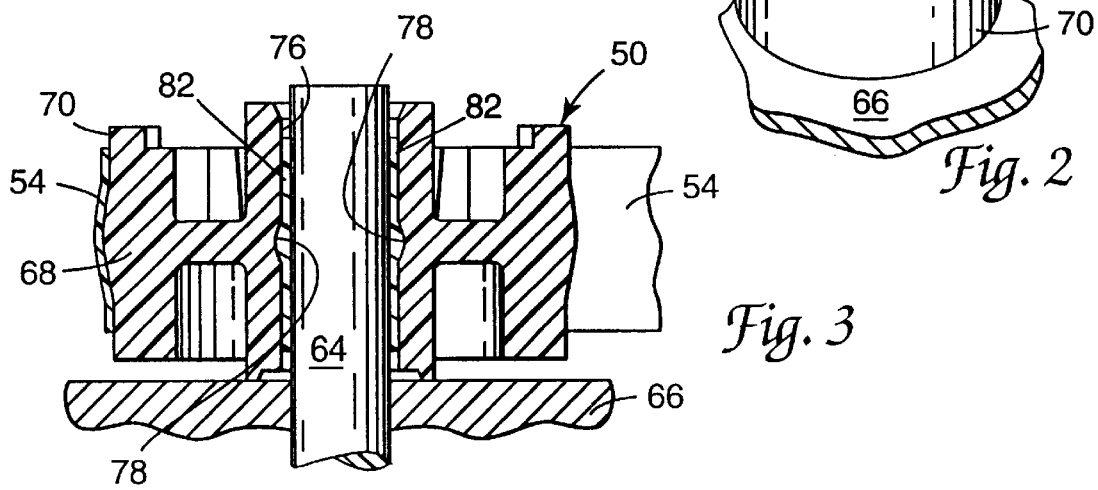
FIG. 3 is a cross-sectional view of the corner roller mounted on a corner roller shaft of FIG. 2 taken along line 3—3 of FIG. 2.

FIGS. 2 and 3 show a portion of the inside of data cartridge 10 which includes corner roller assembly 50. Corner roller assembly includes corner roller 62 rotatably mounted on a shaft 64. The shaft 64 is mounted in a baseplate 66 such that the corner roller 62 rotates about an axis which is substantially perpendicular to the baseplate 66. As shown best in FIG. 3, the corner roller 62 includes a body 68 which has an external periphery 70 for guiding a drive belt 54 (shown in FIG. 3, but not shown in FIG. 2). The corner roller 62 also has a central bore defined by an inner periphery 76. The central bore is adapted to receive the shaft 64. Generally, configuring the central bore with a diameter approximately 1.1 mils (0.028 mm) greater than the diameter of the shaft 64 has been found to be suitable in the practice of the present invention. For purposes of clarity, the space between the shaft 64 and the inner periphery 76 has been exaggerated in FIG. 3. We have also found that it is desirable for the inner periphery 76 to have a surface roughness (Ra) of about 15 microinches (0.56 $\mu$m) to 25 microinches (0.96 $\mu$m), preferably about 20 microinches (0.71 $\mu$m). In the practice of the present invention, surface roughness (Ra) is measured using a Taylor-Hobson Talysurf 10 apparatus.

As seen best in FIG. 3, the external periphery 70 is configured with a slight crown to help prevent the drive belt 54 from shifting away from a centered position on the external periphery 70 as the drive belt 72 is guided by the corner roller 62. See, e.g., von Behren et al., "Mechanical Design of a Belt-Driven Data Cartridge," *Adv. Info. Storage Syst.* 1 (1991), pp. 49–59 for a discussion of this design. FIG. 3 also shows that the shaft 64 extends slightly above the top of the central bore. FIG. 3 also shows a slight sink 78, i.e., concavity, on the inner periphery 76. When the corner roller 62 is formed from a polymeric material, the sink 78 forms naturally as the corner roller cools after being released from its mold, because the walls of body 68 of the corner roller 62 are thicker around its center than at its ends. Advantageously, the sink forms a chamber for holding the lubricant 82.

The shaft 64 can be made from a wide variety of materials. Preferably, the shaft 64 is formed with at least a metal coating or more preferably is entirely formed from a metal. A preferred metal material is hardened steel (SAE 52100, $R_c \geq 60$), stainless steel, or the like. The corner roller 62 can also be made from a wide variety of materials, but is preferably formed from a thermoplastic or thermosetting resin such as polytetrafluoroethylene, high density polyethylene, polyamide, polyurethane, polyacetal resin, or a carbon-fiber reinforced polyacetal resin.

In order to help control tape tension and drive force characteristics of cartridge 10, a lubricant 82 is provided on the interface between corner roller 62 and shaft 64 in order to maintain corner roller drag force within a desired, nonzero drag force range over the intended range of tape operational speeds and temperature. The amount of lubricant 82 applied between corner roller 62 and shaft 64 can be varied depending upon the viscosity of the lubricant and the desired level of drag force. However, if too little lubricant is used, the drag force may become too high or be unstable. On the other hand, if too much lubricant is used, the excess lubricant can migrate out from between corner roller 62 and the shaft 64. Generally using an amount of lubricant sufficient to occupy 60 percent to 100 percent, more preferably about 70 percent, of the volume of the central bore remaining after the roller 62 is mounted on shaft 64 has been found to be suitable in the practice of the present invention.

Except for preselected differences between corner roller assembly 50 and 52 which will now be described in more detail below, corner roller assembly 52 may otherwise be similar to corner roller assembly 50 in terms of including a corner roller, a shaft and a lubricant, as desired.

In the practice of the present invention, the corner roller assemblies 50 and 52 are configured such that one or more design parameters of one of the assemblies is preselected to be different than the corresponding one or more design parameters of the other assembly. The use of non-identical designs, in turn, allows the drag force profile of one of the assemblies to be different than the drag force profile of the other assembly. By appropriate selection of differences to incorporate into the corner roller assemblies 50 and 52, the drag force profile of each corner roller assembly can be established in a manner which provides improved control over the tape tension and drive force characteristics of the belt driven tape cartridge over a wide range of operating conditions. The advantages of the inventive approach will now be described firstly with respect to FIGS. 4A, 4B, 4C, and 4D, and then with respect to FIGS. 5A and 5B.

Figure 4A:
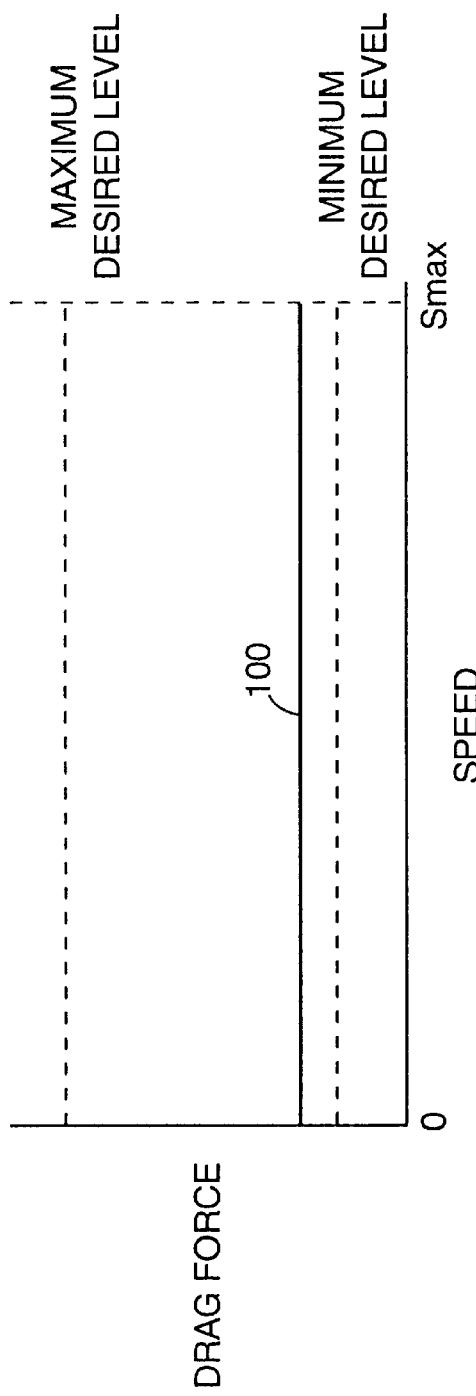
FIG. 4A is an ideal drag force profile which is substantially flat across a pre-defined speed range.

Referring first to FIG. 4A, there is shown an idealized drag force profile 100 showing drag force as a function of tape speed for a corner roller assembly over an operating range extending from 0 inches per second ("ips") to an intended maximum operating speed designated as $S_{max}$. In practice, the magnitude of $S_{max}$ will depend upon the intended usage of the tape cartridge, the type of cartridge, track density of the tape, tape drive characteristics, and the like. Currently, $S_{max}$ for most commercially available tape cartridges is about 120 ips. This value for $S_{max}$ is not intended to be limiting, however, and the present invention would be suitable for use with any kind of data storage device having $S_{max}$ values which are higher or lower than this value, as desired.

FIG. 4A shows that a corner roller assembly must maintain a minimum level of drag force, $DF_{min}$, over all intended operating speeds in order for the cartridge to function properly. On the other hand, the maximum drag force, $DF_{max}$, must be below a maximum level if a tape cartridge incorporating the corner roller assembly is to function efficiently. For example, if drag force is too high, then tape tension and drive force of the cartridge also tend to be high as well. Ideally, as shown, the drag force profile 100 would be substantially flat and as close to the minimum drag force level, $DF_{min}$, as is shown. In actual practice, however, such extremely flat drag force profiles have not yet been achieved economically. Drag force characteristics of the currently used corner roller assemblies tend to vary as a function of speed.

Figure 4B:
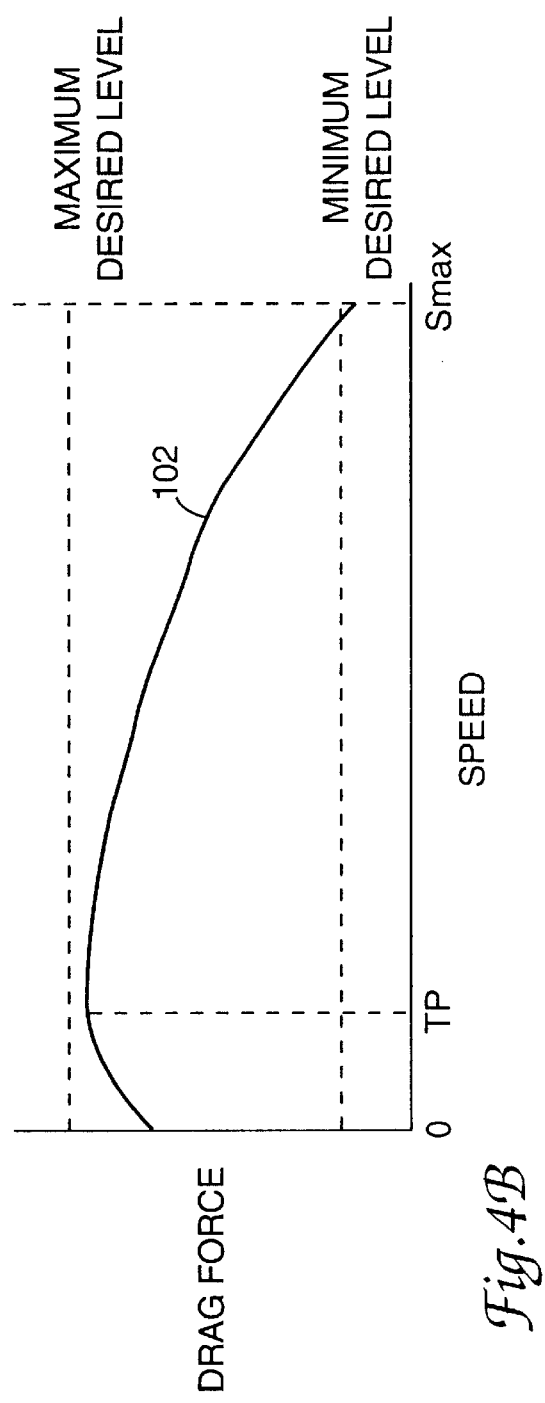
FIG. 4B is a drag force profile having a transition point at a relatively low speed.
Figure 4C:
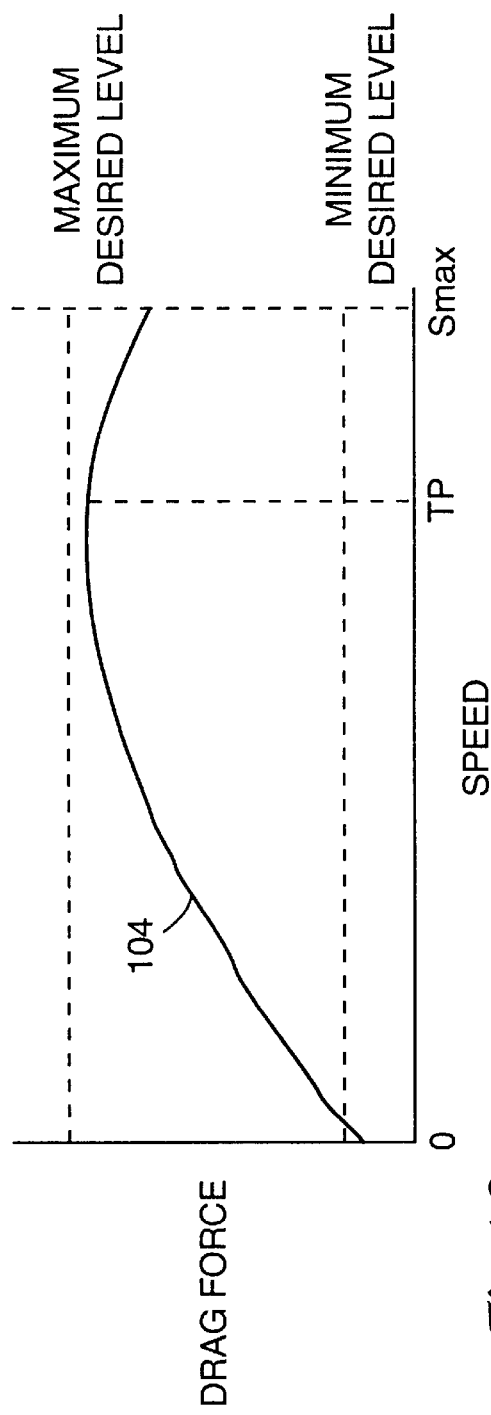
FIG. 4C is a drag force profile having a transition point at a relatively high speed.
Figure 4D:
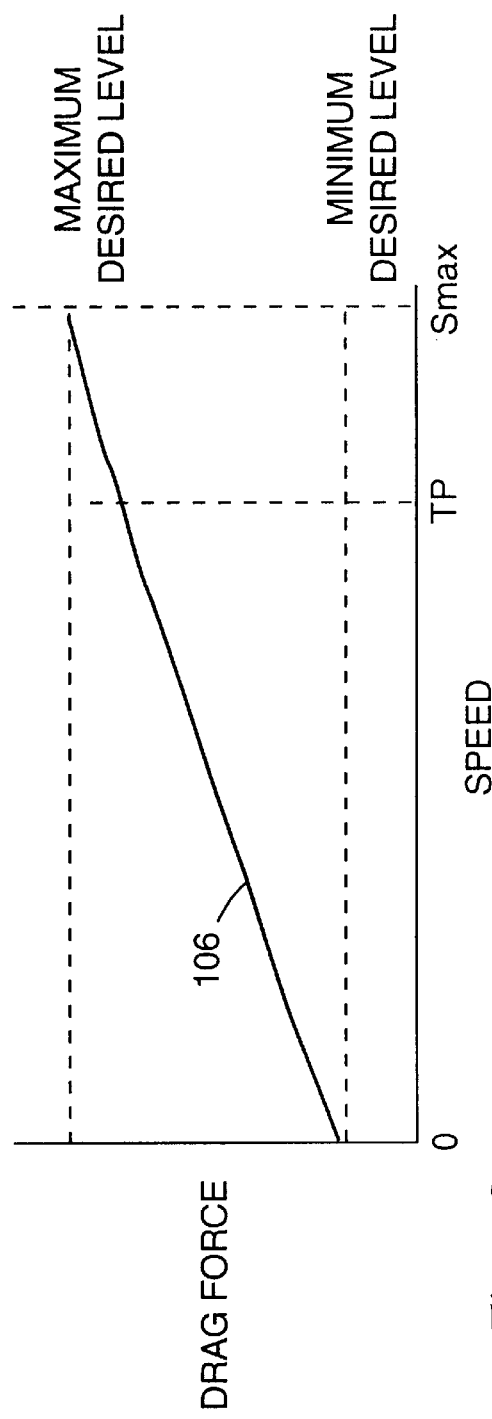
FIG. 4D is a drag force profile having a transition point well above a pre-defined speed range such that the profile generally tends to increase in the speed range.

Typical drag force profiles more representative of actual corner roller assemblies are shown in FIGS. 4B, 4C, and 4D. FIG. 4B shows a drag force profile 102 in which the profile has a maximum value in the desired operating range which occurs at a relatively low speed. In the practice of the present invention, the speed which corresponds to the maximum value is referred to as the transition point, TP, of the profile. At tape speeds less than the transition point, the profile has a positive slope. At higher speeds, the profile has a negative slope. Because the transition point TP of the profile 102 of FIG. 4B occurs at a relatively low speed, a majority of the profile 102 is characterized by a negative slope over a substantial portion of the speed range. While not wishing to be bound by theory, it is believed that the transition point associated with a lubricant results from a change in the lubrication mechanism, e.g., boundary, mixed, and/or hydrodynamic mechanisms, and the like, as the shear rate acting upon the lubricant changes.

The profile 102 shown in FIG. 4B is not an optimum profile for drag force. Generally, if the corner roller assembly design providing such a profile were to be used at both corner roller locations in a cartridge, the cartridge would have undesirably high tape tension and drive force values at relatively low speeds proximal to the transition point, and undesirably low tape tension values at relatively high speeds. It would be desirable if, somehow, the high values could be lowered, and the low values raised, in order to flatten the profile 102. The drag force profile 102 of FIG. 4B is characteristic of a corner roller having a lubricant of the type which comprises a linear, nonpolar, perfluoropolyether base oil having a relatively high molecular weight, e.g., a molecular weight in the range of 10,000 to 20,000, more preferably 10,000 to 15,000, and most preferably about 13,000.

The drag force profile 104 of FIG. 4C is identical to that of FIG. 4B in all respects, except that the transition point TP occurs at a relatively higher tape speed. Thus, the profile 104 of FIG. 4C has a substantially positive slope over a substantial portion of the speed range. Such a profile also is not an optimum profile for drag force. Tape tension values for a cartridge incorporating corner roller assemblies providing such a profile would tend to be too low at low tape speeds, and tape tension and drive force values would be too high at high tape speeds. Just as it was the case with FIG. 4B, it would be desirable if, somehow, the high values could be lowered, and the low values raised, in order to flatten the profile 104. The profile 104 of FIG. 4C is characteristic of a corner roller assembly in which the lubricant is of the type which comprises a linear, nonpolar, perfluoropolyether base oil having a relatively high molecular weight, e.g., a molecular weight in the range of 2,000 to 10,000, preferably 5,000 to 10,000, and more preferably about 7,000 to 9,500.

It is worth noting that the profiles 102 and 104 of FIGS. 4B and 4C are complementary in many respects. One profile is high where the other is low at the ends of the operating range, and both are relatively neutral in the middle of the operating range. Therefore, corner roller assemblies having each of these profiles could be advantageously used together in a data cartridge to provide more uniform tape tension and drive force than could be achieved by using either corner roller assembly design alone.

The drag force profile 106 of FIG. 4D is of the type which generally lacks a transition point within the intended operating range and also tends to be positively sloped across the entire intended operating range as well. In effect, the TP of this lubricant would be located at a speed above $S_{max}$. This kind of profile also is not optimum, in that the steady increase in drag force with speed may involve resultant tape tensions and drive forces which are too low at lower speeds and too high at higher speeds. The profile 106 of FIG. 4D is characteristic of cartridges in which the corner roller assembly includes a lubricant of the type which comprises a synthetic hydrocarbon base oil. It is worth noting that profile 102 and 106 are also complimentary across a substantial portion of the speed range, and therefore corner rollers having each of these profiles could be advantageously combined in a data cartridge to provide more uniform tape tension and drive force than could be achieved by using either corner roller assembly design alone.

The drag force profile of a particular corner roller assembly design is closely related to the corresponding tape tension and drive force profiles obtained for a tape cartridge into which the corner roller assembly design is incorporated. In fact, if the same corner roller assembly design is used at both corner roller locations, the drag force profile will have a shape which is substantially identical to that of the corresponding tape tension and drive force profiles. As a practical matter, only the magnitude of the individual drag force profile at individual tape speeds would differ from those of the corresponding tape tension or drive force profiles. The correspondence arises because the overall drag force of the two corner roller assemblies is the sum of the drag forces contributed by each assembly individually. In contrast, when different corner roller assemblies are incorporated into a data cartridge, the resultant tape tension and drive force profiles will have a shape which is a composite of the dissimilar drag forces contributed by each corner roller assembly.

Figure 5A:
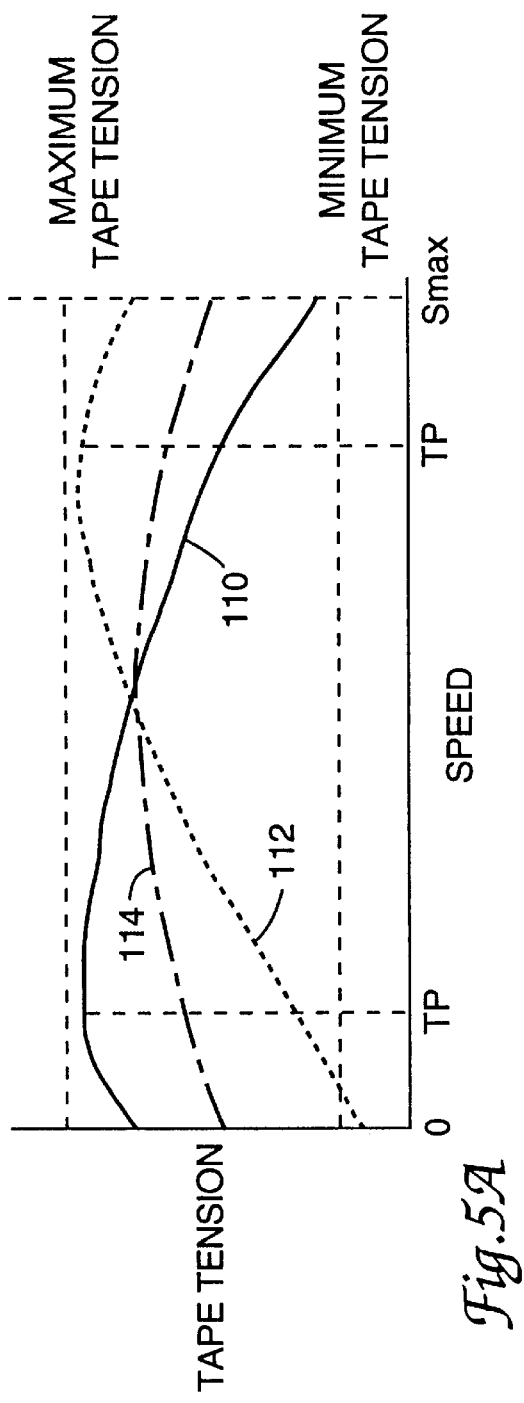
FIG. 5A shows that using two different corner roller assemblies according to the present invention provides a substantially flatter tape tension profile than using two identical corner roller assemblies.

FIG. 5A illustrates how the principles of the present invention can be implemented to improve the tape tension characteristics of a belt-driven tape cartridge. In FIG. 5A, curve 110 represents the tape tension profile of a data cartridge incorporating two identical corner roller assemblies characterized by a low transition point. Curve 112 represents the tape tension profile of a data cartridge incorporating two identical corner roller assemblies characterized by a relatively high transition point. In contrast, curve 114 represents a tape tension profile of a tape cartridge of the present invention containing two different corner roller assemblies. One corner roller assembly corresponds to the type of assembly that was used to obtain curve 110, and the other assembly corresponds to the type of assembly that was used to obtain curve 112.

FIG. 5A shows that the performance improvement of using two different corner roller assemblies is dramatic. It is known that the total drag force provided by both corner roller assemblies 50 and 52 in belt-driven data cartridge 10 is the sum of the drag force exerted by each individual corner roller assembly. See von Behren et al., "Mechanical Design of a Data Cartridge", *Adv. Info. Storage Sys.*, (1991) at 1. Therefore, the total drag produced by each individual corner roller assembly may be summed to provide the total drag for the corner roller system in the cartridge. Because the total drag force attributable to both corner roller assemblies is the sum of the drag force exerted by each individual corner roller in the cartridge, the two different corner roller assemblies used to obtain curve 114 complement each other such that more uniform tape tension across the intended operating range is achieved.

For example, for curve 114, at the low and high speed ends of the operating range, the high tape tension values attributable to one of the corner roller assemblies is offset by the relatively low tape tension values attributable to the other assembly. This tends to produce resultant overall tape tension at the ends of the operating range which is more neutrally located within the desired tape tension range than if only one kind of corner roller assembly design were to be used at both corner roller locations. Similarly, because the tape tension values attributable to each individual corner roller assembly have opposite slopes over the middle portion of the intended operating range, the increase in tape tension of one corner roller assembly tends to be offset by the decrease in tape tension of the other assembly, thus providing a resultant tape tension in the middle portion of the operating range which remains more constant than if only one kind of corner roller assembly design were to be used.

Figure 5B:
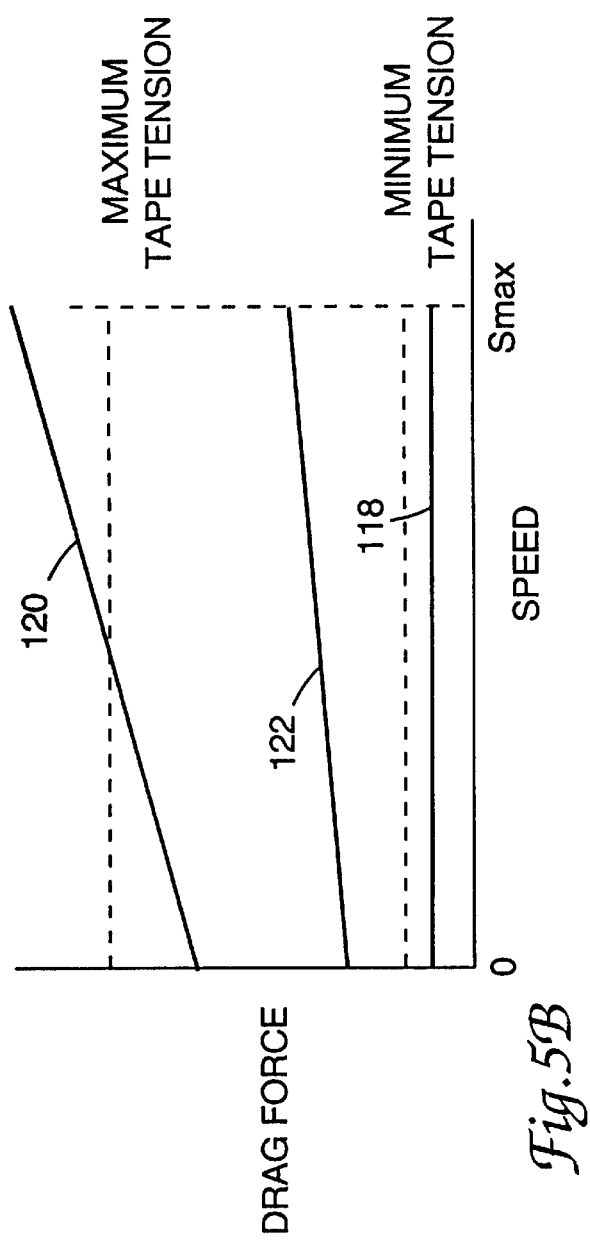
FIG. 5B also shows that using two different corner roller assemblies according to the present invention provides a substantially flatter tape tension profile than using two identical corner roller assemblies.

FIG. 5B also illustrates how the principles of the present invention can be implemented to improve the tape tension characteristics of a belt driven tape cartridge. In FIG. 5B tape tension profile 118 is substantially flat, which is extremely desirable. However, profile 118 is characterized by values which are entirely below the desired minimum tape tension level. Tape tension profile 120, on the other hand, generally shows increasing tape tension values with increasing speed and, in fact, increases to values which are above the desired tape tension maximum level. Thus, neither profile 118 nor 120 is satisfactory by itself. In contrast, tape tension profile 122 represents the tape tension profile of a data cartridge incorporating two different corner roller assemblies. One corner roller assembly corresponds to the type of assembly that was used to obtain profile 118, and the other assembly corresponds to the type of assembly that was used to obtain profile 120. Because the two different corner roller assemblies used to obtain profile 122 complement each other, note that all of the values of profile 122 lie within the desired tape tension range. Also note that although not as flat as profile 118, profile 122 is substantially flatter than profile 120. Thus, profile 122 represents a tape tension profile which is more desirable than either profile 118 or 120.

In the practice of the present invention, a drag force profile for a particular corner roller assembly design is determined according to an approach in which the corner roller assembly to be tested, including the corner roller, shaft, and lubricant if any, is mounted onto a suitable base plate at a distance of about 9 cm from a motor driven roller. The corner roller assembly is adjusted so that the bottom of the corner roller is just out of contact with the base plate. The motor driven roller is mounted on a separate base plate which is slideable relative to the corner roller assembly so that the axis of rotation of the driven roller and the corner roller assembly are parallel to each other and perpendicular to the corresponding base plate. An inelastic drive belt having a belt length of 22 cm is used to couple the driven roller to the corner roller assembly. As used in the practice of the present invention, the term "inelastic" with respect to the drive belt means that the drive belt is characterized by a strain of 0.3% or less when a side load of 30 ounces is applied to the driven roller. One example of a material found to be suitable for making the inelastic drive belt is available under the trade designation "MYLAR" from E.I. duPont de Nemours and Co.

A side load is applied in order to draw the belt taut and is accomplished by coupling a side load weight to the slideable structure supporting the motor driven roller. The weight induces a desired amount of tension in the inelastic drive belt. In the practice of the present invention, a side load in the range of 15 to 30 ounces has been found to be suitable. Generally, selecting any side load within this range would be suitable in the practice of the present invention, so long as substantially the same side load is used to generate all the drag force profiles which are to be compared. Most desirably, however, a side load is used which is approximately twice the tension of the drive belt tension which is to be used in the belt driven cartridge intended to incorporate the corner roller assembly designs under investigation. For example, if the corresponding belt driven data cartridge is to be characterized by a drive belt tension of about 15 ounces, then a side load of about 30 ounces could be used. In the event that a variation in the drag force profile is observed with changes in the side load, i.e., the transition point for a profile shifts by more than 5 ips when varying the side load from 15 to 30 oz., then the profile is to be determined at a side load of 30 ounces.

Next, the motor driven roller is operated at a rotational speed corresponding to an inelastic belt speed of 30 inches per second ("ips"). The motor driven roller is coupled to a monitor and computer control capable of determining the force required to rotate the drive roller at a particular speed based upon calibrated torque values of the motor. The assembly is driven through four cycles including operation in a forward direction for 45 seconds, then a reverse direction for 45 seconds, then a forward direction for 45 seconds, and then the reverse direction for 45 seconds. The drag force at 30 ips is then calculated as the average value over all four cycles. The test is repeated for at least three additional speeds selected to reasonably span and be representative of drag force in the range encompassing speeds of 40, 60, 80, 90, 100, 120 and optionally 140 ips. The drag force at each selected speed can then be plotted as a function of speed to obtain the drag force profile for the corner roller assembly. The transition point will be deemed to be the speed corresponding to the peak maximum at which the slope of the drag force profile changes from a positive to a negative value.

Figure 7:
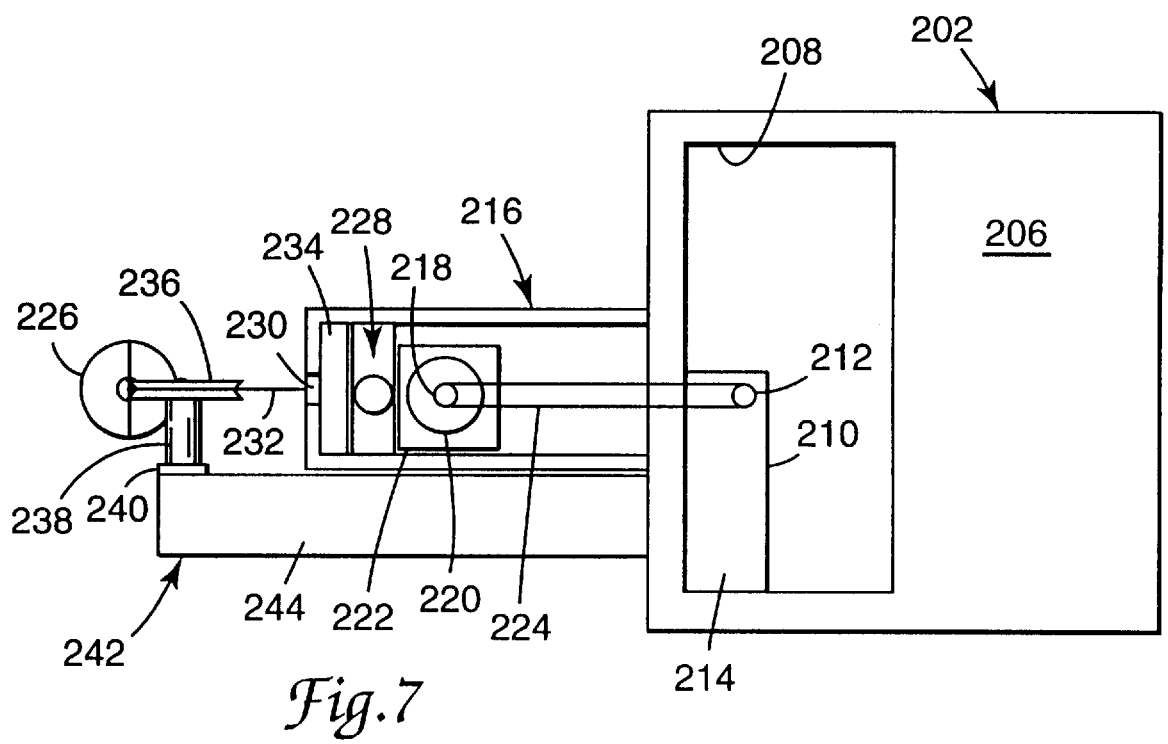
FIG. 7 is a plan view of the apparatus of FIG. 6.
Figure 8:
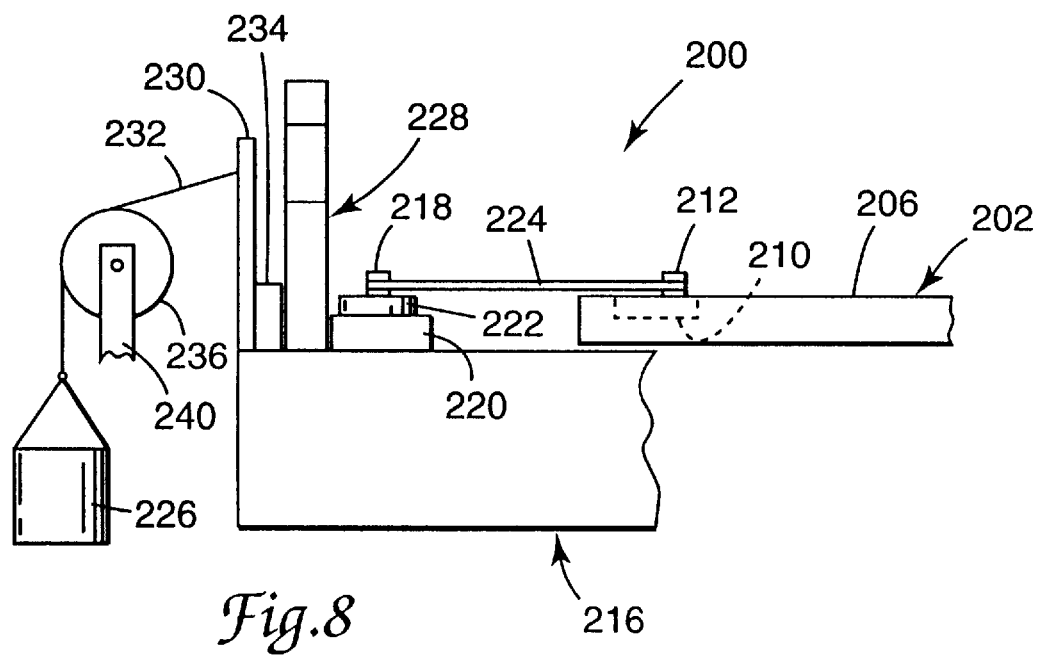
FIG. 8 is a side view of a portion of the apparatus shown in FIG. 6 in which the support arm has been removed to better illustrate the relationship between the sliding carriage assembly and the main table.

Referring now to FIGS. 6–8, there is shown one embodiment of a drag force tester 200 found to be suitable in the practice of the present invention. Drag force tester 200 includes a main table 202 supported upon legs 204. The top surface 206 of main table 202 is provided with a recess 208 adapted to receive a base plate 210 to which the corner roller assembly 212 to be tested is mounted. Base plate 210 can be clamped into recess 208 using any convenient clamping device. In particular, an ordinary C-clamp (not shown) has been found to be suitable for this purpose. Recess 208 is configured such that the top surface 214 of base plate 210 is flush with the top surface 206 of main table 202, when base plate 210 is clamped in place.

Drag force tester 200 further includes a sliding carriage assembly 216 which supports a motor driven roller 218 on a motor driven roller base plate 220. Base plate 220 is disposed over motor 220 which is capable of rotatably driving motor driven roller 218 at a variety of speeds. Although not shown, suitable electric wiring couples motor 220 to a monitor and computer control capable of determining the force required to rotate the motor driven roller 218 at a particular speed. Motor driven roller 218 is coupled to the corner roller assembly 212 by inelastic drive belt 224. Sliding carriage assembly 216 is slideable so that drive belt 224 can be drawn taut upon application of a suitable side load 226 to sliding carriage assembly 216. Sliding carriage assembly 216 is configured so that the friction associated with moving sliding carriage assembly 216 is negligible compared to the weight of side load 226. Height adjustment mechanism 228 can be used to raise and lower base plate 220 which in turn causes the height of motor driven roller 218 to change. Inasmuch as the inelastic drive belt tends to seek a centered position on both corner roller 212 and motor driven roller 218, both of which are configured with a slight crown on their outer peripheries, raising and lowering motor driven roller 218 also tends to raise and lower corner roller 212 as well. In this way, the height of corner roller assembly 212 can be adjusted so that corner roller assembly 212 is just out of contact with base plate 210 during testing.

In order to couple side load 226 to sliding carriage assembly 216, side load 226 is attached to post 230 by line 232. Support block 234 helps brace post 230. In order to allow side load 226 to hang vertically, line 232 passes over pulley wheel 236. Pulley wheel 236 is rotatably coupled to side arm 238, which in turn is attached to vertical post 240. Post 240 is attached to support arm 242, which in turn is attached to main table 202. Support arm 242 includes horizontal flange 244 and vertical flange 246.

To measure tape tension and drive force profiles, a belt driven data cartridge to be examined is inserted into a tape drive adapted to monitor and record tape tension and drive force levels via a computer control. Tape tension and drive force are monitored as the tape is transported at a particular operating speed from the beginning of the tape to the end of the tape in the forward and reverse directions. Tape tension is monitored at the area where the tape contacts the transducer head. The result of these measurements provides a drive force curve and a tape tension curve at a given tape speed. The tape tension and drive force curves obtained at a given speed in this way are commonly referred to in the art as "bow tie" curves. From this information, the minimum tape tension, the maximum tape tension, and the maximum drive force in the forward and reverse directions can be determined at the given tape speed, as desired. The test is then repeated at a number of additional tape speeds sufficient to develop appropriate drive force and tape tension profiles. Generally, data is collected at least three and preferably 4 to 10, preferably 4 to 5 different tape speeds. Thus, a drive force profile and tape tension profiles of any of the tape tension characteristics, such as the maximum tape tension, minimum tape tension, or average tape tension in the forward and/or reverse tape directions can be determined.

Referring again to FIG. 1, and according to one approach for implementing the principles of the present invention, the first corner roller assembly 50 (or 52 as the case may be) includes a first lubricant and the second corner roller assembly 52 (or 50 as the case may be) includes a second lubricant, wherein the first lubricant and the second lubricant are different. Either corner roller assembly 50 or 52 can be deemed to be the first or second corner roller assembly, as desired, because the overall drag force characteristics provided by the two corner roller assemblies 50 and 52 is a sum of the two individual drag force characteristics. In other words, if a first and second corner roller assembly are designed to be different in accordance with the principles of the present invention, such first and second corner roller assemblies can be placed into the cartridge 10 at either the left and right sides, respectively, or the right and left sides, respectively. For purposes of convenience only, therefore, corner roller assembly 50 will be deemed to be the first corner roller assembly, and corner roller assembly 52 will be deemed to be the second corner roller assembly, although the positions of the first and second corner roller assemblies could be swapped if desired.

Advantageously, the use of two different lubricants in this manner allows the corner roller assemblies 50 and 52 to be provided with complementary drag force profiles. In a preferred aspect of this approach, the first corner roller assembly is characterized by a drag force profile having a relatively low transition point and the second corner roller assembly is characterized by a drag force profile having a relatively high transition point. Preferably, the transition point of the first corner roller assembly occurs at a speed of less than 50 ips, more preferably at a speed of about 40 ips or less, and the transition point of the second corner roller assembly occurs at a speed of more than 50 ips, more preferably more than about 60 ips, and more preferably at about 70 ips or higher.

Generally, if the transition points of the two corner roller assemblies are too close together, then the ability of one assembly to help offset the undesirable drag force characteristics of the other corner roller assembly may tend to be minimized. Thus, it is generally preferred to have the transition points be as far apart as is practical, balancing other demands placed upon tape cartridge performance. For example, many lubricants of the type incorporating a perfluoropolyether base oil will tend to have a transition point somewhere within the intended speed operating range of a data cartridge, whereas lubricants of the type incorporating a synthetic hydrocarbon base oil tend to have a transition point well above the intended speed operating range of all of the currently commercially available tape cartridges. This might suggest that the lubricants incorporating a synthetic hydrocarbon base oil would always be a better choice for the second lubricant, but such is not the case. Even though the transition point of the hydrocarbon-based lubricant is higher, the perfluoropolyether lubricants tend to have much more stable properties over a wider range of temperatures than the hydrocarbon lubricants. Therefore, in applications in which temperature dependence is a concern, using the lubricant having the perfluoropolyether base oil as the second lubricant may be the better choice.

Interestingly, the best improvement in tape tension and drive force characteristics achieved by implementing the principles of the present invention have not resulted merely from blending two different lubricants characterized by different, but complementary drag force profiles, and then using the resultant blend to lubricate both corner rollers at the same time. Rather, the best performance was obtained when one of the lubricants is used on the first corner roller assembly, and the other lubricant is used on the second corner roller assembly. This phenomena is further illustrated in the examples below.

When selecting appropriate lubricants to use as the first lubricant and the second lubricant, a plurality of lubricant candidates can be identified to be analyzed in the selection process. Transition point and drag force profile characteristics of each of the lubricants are then determined by developing drag force profiles of the lubricants. Much useful information can be determined for each lubricant from such profiles. First, the magnitude of the tape tension and drive force profiles of the lubricant over the intended operational range of a cartridge can be studied. Lubricants whose profiles are too high or too low to be practical can then be eliminated from further consideration. Additionally, the transition point of the lubricant can be identified relative to other lubricant candidates so that a lubricant having a relatively low transition point can be used as the first lubricant and a lubricant having a relatively high transition point can be used as the second lubricant.

Drag force profiles can also be compared to determine the degree to which the profiles for a given lubricant pair are complementary. For example, if one lubricant provides a drag force profile which is high at low speeds, neutral at middle operational speeds, and low at high speeds (i.e., high/neutral/low profiles), a complementary lubricant would have a low/neutral/high profile so that low values of one lubricant are offset by high values of the other across the intended operating range of the cartridge. Preferably, the first lubricant and the second lubricant are characterized by complementary drag force profiles across as much of the intended operating range of the cartridge as is practically possible. Thus, if a predetermined speed range, e.g., 0 to 150 ips, or 0 to 120 ips, as desired, is apportioned into a low speed range encompassing the first approximately 25% of the intended total speed range, and a middle speed range encompassing about the middle 50% of the intended total speed range, and a high speed range encompassing approximately the high 25% of the total speed range, the first lubricant and the second lubricant are characterized by drag force profiles which are preselected to be complementary over at least one, preferably at least two, and more preferably all three of said low, middle, and high portions of the total speed range.

After a suitable lubricant pair is selected, the first lubricant can be incorporated into the first corner roller assembly, and the second lubricant can be incorporated into the second corner roller assembly. The resultant belt-driven data cartridge will have a more uniform tape tension and drag force profile over a wider range of tape speeds than if only one of such lubricants were to be used to lubricate both corner roller assemblies.

In particularly preferred embodiments of the present invention, the first lubricant comprises a linear, nonpolar, perfluoropolyether base oil having a first molecular weight, and the second lubricant comprises a linear, nonpolar perfluoropolyether base oil having a second molecular weight wherein the difference in molecular weight between the first molecular weight and the second molecular is in the range from 1,000 to 25,000, preferably 1,500 to 10,000, and more preferably 1,500 to 6,000. An alternative embodiment of the invention, the differences between the first molecular and the second molecular weight can be expressed as a ratio between the two molecular weights. Thus, in some embodiments of the present invention, it is preferred if the ratio of the first molecular weight to the second molecular weight is in the range from 1.2:1 to 20:1, preferably 1.2:1 to 5:1, and most preferably 1.2:1 to about 2:1. In instances in which the first and/or second lubricant includes more than one base oil, the molecular weight associated with that lubricant shall be the weighted average of the molecular weights. For example, if a lubricant includes 10 parts by weight, 30 parts by weight, and 60 parts by weight of three different perfluoropolyether base oils having molecular weights of 15,000, 60,000, and 25,000, respectively, the weighted average of the molecular weights would be $(0.10)(15,000)+(0.30)(60,000)+(0.60)(25,000)=34,500$.

The embodiment of the present invention in which the first and second lubricants include linear, nonpolar perfluoropolyether base oils with differing molecular weights is particularly advantageous for several reasons. First, lubricants comprising linear, nonpolar, perfluoropolyether base oils tend to have reasonably stable lubricating properties over a wider range of operating temperatures than other classes of lubricants. Lubricants comprising other types of base oils, such as synthetic hydrocarbon base oils, tend to have a greater degree of temperature dependence. Additionally, lubricants comprising such perfluoropolyether base oils can be selected which tend to have transition points at both ends of the intended tape speed operating range of belt driven tape cartridges so selection of lubricant pairs having complementary profiles is simplified.

Further, the location of transition points for such lubricants tends to correspond to the molecular weight of the perfluoropolyether base oil present in the lubricant. For example, lubricants comprising a linear, nonpolar, perfluoropolyether base oil having a higher molecular weight will tend to have a lower transition point than a comparable lubricant in which the linear, nonpolar, perfluoropolyether base oil has a lower molecular weight. Thus, as an alternative to developing tape tension, drag force, and/or drive force profiles in order to identify complementary lubricant pairs, the molecular weight of the base oils can be used to identify suitable lubricant pairs instead. Of course, developing tape tension, drag force, and/or drive force profiles is more rigorous and allows better engineering choices to be made, but using molecular weight as a selection criteria is much easier. Preferably, to minimize expense, therefore, molecular weight can be used as a preliminary screening tool to identify potential lubricant pair candidates at the outset, and the more rigorous use of profiles can then be used to choose the best lubricant pair from the screened pairs.

In the practice of the present invention, the term "linear" with respect to the perfluoropolyether base oil means that the base oil is characterized by a linear molecular chain. Generally, molecules with a linear molecular chain tend to be more flexible and therefore are characterized by a lower $E_a$ and a lower $T_g$ as compared to branched chain molecules. Generally, the temperature dependence of a lubricant's viscosity is reduced by the use of base oils with a linear molecular chain.

The term "polyether" with respect to the perfluoropolyether base oil means that the backbone of the base oil comprises a repeating unit wherein such repeating unit contains a C—O bond. The polyethers of the present invention may contain one or more different kinds of such repeating units. Preferred embodiments of polyethers will be described in more detail below.

The term "nonpolar" with respect to the base oil means that the end groups of the base oil have substantially no hydrogen bonding ability or electron withdrawing or donating ability when considered in conjunction with the rest of the molecule to which the end groups are attached. Examples of nonpolar end groups suitable in the practice of the present invention include monovalent lower perfluoroalkyl moieties of 1 to 10 carbon atoms, preferably 1 to 4 carbon atoms. Preferably, the lower alkyl or lower perfluoroalkyl moieties are linear. Particularly preferred examples of such moieties include CH$_3$—, CF$_3$—, CF$_3$CF$_2$—, CH$_3$CH$_2$—, and the like.

The nonpolar or polar character of an end group may be affected by the nature of the moiety adjacent to it on the molecular chain. For example, a perfluoroalkyl end group adjacent to an alkyl moiety will be polar, whereas the same end group adjacent to a more chemically similar perfluoroalkyl or perfluorooxyalkyl moiety will be nonpolar. Similarly, an alkyl end group will be polar when adjacent to a perfluoroalkyl or perfluorooxyalkyl moiety, but nonpolar if adjacent to an alkyl moiety. Generally, base oils with non-polar end groups have less internal friction due to intermolecular attractive forces as compared to base oils with polar end groups.

In embodiments of the present invention in which the first and second lubricants each comprise a perfluoropolyether base oil having a suitable molecular weight, it is preferred if each of the first and second lubricants include the base oil and a thickening agent and if the base oil is a perfluoropolyether represented by the formula

$$W_f\text{—}O\text{—}(Z')_m\text{—}W_f \qquad (1)$$

In this formula, each $W_f$ is independently a monovalent, linear, nonpolar perfluoroalkyl group having from 1 to 20 carbon atoms, preferably 1 to 4 carbon atoms, and more preferably is —CF$_3$. Z' comprises at least one linear oxyperfluoroalkylene moiety of the formula —(C$_n$F$_{2n}$O)—. The integer n has a value of 1 to 10, more preferably 1 to 4. The integer m has a value such that the linear perfluoropolyether has a molecular weight in the desired range. A general discussion of the properties and methods of preparation of these materials is found in George R. Lappin and Joe D. Sauer, eds., *Alpha Olefins Applications Handbook* (New York: Marcel Dekker, 1989), p. 353. Linear, nonpolar perfluoropolyethers are commercially available from Ausimont USA, Inc. under the FOMBLIN tradename and Daikin Industries, Ltd. under the DEMNUM tradename.

In those instances of the perfluoropolyethers of Formula (1) wherein Z' comprises more than one kind of oxyperfluoroalkylene moiety, e.g., a combination of —(CF$_2$O)— and —(CF$_2$CF$_2$O)— groups, the different groups may be either randomly distributed or grouped in blocks in the chain. Specific examples of more preferred linear perfluoropolyethers according to Formula (1) include:

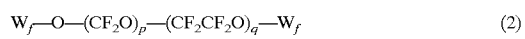
$$W_f\text{—}O\text{—}(CF_2O)_p\text{—}(CF_2CF_2O)_q\text{—}W_f \qquad (2)$$

wherein the oxyperfluoroalkylene groups, —CF$_2$CF$_2$O— and —CF$_2$O—, are either randomly distributed or grouped in blocks in the chain, p is an integer from 1 to 200, preferably 20 to 80, q is an integer of 1 to 200, preferably 20 to 80, each $W_f$ is independently a nonpolar end group as described above, and more preferably is CF$_3$— or CF$_3$CF$_2$—. The ratio p/q is preferably in the range from 0.5 to 100, and most preferably is about 22. This ratio may be determined by nuclear magnetic resonance (NMR) spectroscopy.

In addition to the linear, nonpolar perfluoropolyether base oil, the preferred lubricants also include a thickening agent. The presence of the thickening agent not only tends to provide the lubricant with a grease-like consistency, but it also provides the lubricant with a lower $E_a$ as compared to the base oil by itself, thereby reducing the temperature dependence of viscosity of the resulting lubricant as compared to the base oil. Generally, using 1 to 60, preferably 10 to 40 and more preferably 20 to 30 parts by weight of the thickening agent together with 40 to 99 parts by weight of the base oil has been found to be suitable in the practice of the present invention. The resulting lubricant preferably has a viscosity less than or equal to about 2 Pa-s at 22° C. at a shear rate of 15,000 s$^{-1}$.

A wide variety of thickening agents are suitable in the practice of the present invention, including metallic salts of a fatty acid wherein the counterion is an ion of Ba, Si, Zn, Pb, K, Na, Cu, Mg, Sr, Ca, Li, Al, and the like; clays; polyureas such as those having 2–20 urea bonds and a molecular weight of 100 to 50,000; cellulose derivatives; fluorinated resin particles; fatty acid esters of dextrin; carbon black; silicon dioxide; aluminum complexes; and the like. Thickening agents have been described in U.S. Pat. Nos. 4,711,523, 4,507,214, and 4,406,801.

In preferred embodiments of this invention, thickening agent includes fluorinated resin particles. In a particularly preferred embodiment, the fluorinated resin particles are substantially spherical and preferably less than one micron in diameter, more preferably 0.05 microns to 0.5 microns in diameter, and most preferably about 0.1 microns in diameter. The size of individual particles is generally measured using a method such as transmission electron microscopy (TEM). A relatively smaller fluorinated resin particle size is desirable to achieve the proper grease-like consistency without an excessively high loading of fluorinated resin particles in the lubricant. The fluorinated resin particles act as both a thickening agent and an anti-wear agent for the rotating member which the lubricant contacts. In addition to providing lubricating properties, the linear perfluoropolyether base oil serves as a dispersant for the fluorinated resin particles so that no additional dispersing agents are required in the lubricant.

Preferred fluorinated resin particles are characterized by a surface energy of less than about 30 dyn/cm and a surface area of at least 9 $m^2$/g. More preferably, the surface area is at least 20 $m^2$/g. For the purposes of this invention, surface area of the particles is measured by nitrogen absorption using a Model 4200 Automatic Surface Area Analyzer from Lees & Northrup Instruments. The measured area of the particles includes the internal or porous surface area.

The fluorinated resin particles can be made from any of a variety of suitable fluorinated resins. Examples of suitable fluorinated resins include polytetrafluoroethylene (PTFE), polyhexafluoropropylene, perfluoroalkyl vinyl ethers, and the like. The use of fluorinated resins for making fluorinated resin particles has been described in U.S. Pat. Nos. 4,724,092 and 4,472,290. Preferably the fluorinated resin is PTFE with a number average molecular weight in the range from 2,000 to 100,000. Fluorinated resin particles are commercially available either dispersed in a solvent or as a dry powder. Preferably, the fluorinated resin particles are present in the amount of between 1 and 40 parts by weight per 100 parts of the lubricant, and more preferably between 1 and 30 parts by weight per 100 parts of the lubricant, and most preferably about 20 parts by weight per 100 parts of the lubricant. Examples of suitable fluorinated resin particles are those which are commercially available from E.I. duPont de Nemours and Co. under the VYDEX and TEFLON tradenames, Ausimont USA, Inc. under the ALGOFLON and HALON tradenames, Daikin Industries, Ltd. under the POLYFLON tradename, Hoechst AG under the HOSTAFLON tradename, and Imperial Chemical Industries, PLC (ICI) under the FLUON tradename. Particularly preferred particles are MP1000 TEFLON particles, MP1600 TEFLON particles and VYDEX GT particles, all manufactured by E.I. duPont de Nemours and Co., because of their relatively small particle size.

The present invention will now be further described with reference to the following examples in which:

Lubricant A was obtained from Nye Lubricants, Inc. of New Bedford, Mass. This lubricant comprises about 81 parts by weight of a linear, nonpolar perfluoropolyether base oil having a molecular weight of about 9,500 (Z-25 perfluoropolyether available from Ausimont USA, Inc.), about 18 parts by weight of polytetrafluoroethylene particles (Vydex GT particles available from E.I duPont de Nemours, Inc.), and about 1 part by weight of a rust inhibitor (RYTOX 157 FSL rust inhibitor available from E.I. duPont de Nemours and Company.)

Lubricant A' was identical to Lubricant A except that Lubricant A' did not include a rust inhibitor.

Lubricant B was obtained from Nye Lubricants, Inc. of New Bedford, Mass. This lubricant comprises about 81 parts by weight of linear, nonpolar perfluoropolyether base oil having a molecular weight of about 13,000 (Z-60 perfluoropolyether available from Ausimont USA, Inc.), about 18 parts by weight of polytetrafluoroethylene particles (Vydex GT particles available from E.I duPont de Nemours, Inc.), and about 1 part by weight of a rust inhibitor (RYTOX 157 FSL rust inhibitor available from E.I. duPont de Nemours and Company).

Lubricant B' was identical to Lubricant B, except that Lubricant B' did not include a rust inhibitor.

Lubricant C was obtained from Nye Lubricants, Inc. of New Bedford, Mass. This lubricant comprises about 81 parts by weight of linear, nonpolar perfluoropolyether base oil having a molecular weight of about 8,000 (Z-15 perfluoropolyether available from Ausimont USA, Inc.), about 18 parts by weight of polytetrafluoroethylene particles (Vydex GT particles available from E.I duPont de Nemours, Inc.), and about 2 parts by weight of a rust inhibitor (RYTOX 157 FSL rust inhibitor available from E.I. duPont de Nemours and Company).

Lubricant C' was identical to Lubricant C, except that Lubricant C' did not include a rust inhibitor.

Lubricant D was a 50/50 blend of Lubricants A and B'.

Lubricant E included 80 parts by weight of a synethetic hydrocarbon blend, 10 parts by weight PTFE particles, 8 parts by weight lithium hydroxy stearate, and 1 part by weight additives.

EXAMPLE 1

Figure 9:
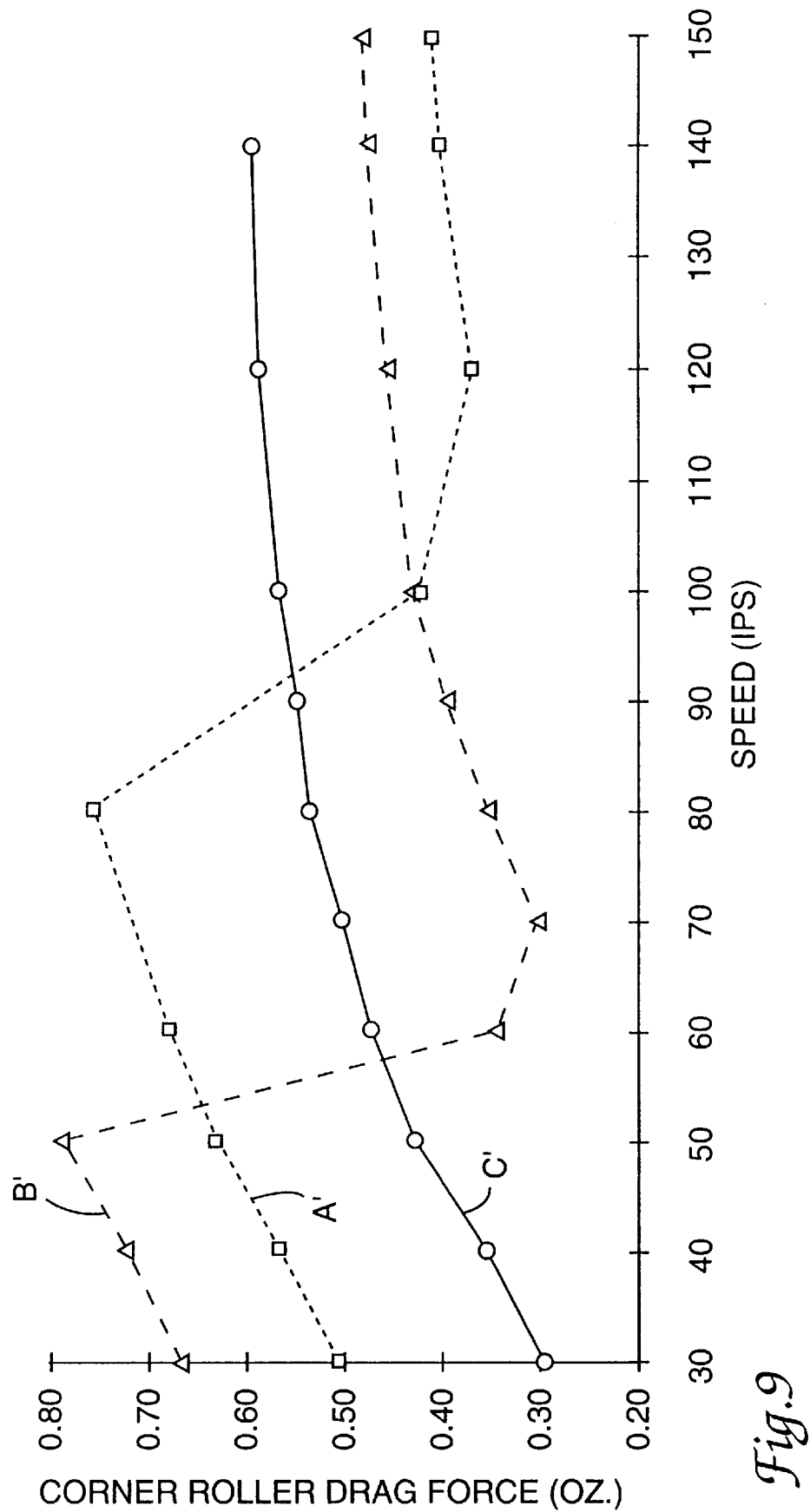
FIG. 9 is a graph comparing the drag force profiles of three different lubricants.

The drag force profile for a corner roller assembly used in a 3.5 inch form factor, belt-driven data cartridge was tested according to the drag force test described above using a side load of 16 oz. Lubricant A' was used as the lubricant. The resultant profile A' is shown in FIG. 9. As shown on profile A', the profile shows that the corner roller assembly had a transition point that occurred at about 80 ips.

EXAMPLE 2

The procedure of Example 1 was repeated, except Lubricant B' was used in the corner roller assembly. The resultant drag force profile B' is shown in FIG. 9. As shown on profile B', the corner roller assembly had a transition point that occurred at about 50 ips.

EXAMPLE 3

The procedure of Example 1 was repeated, except that Lubricant C' was used in the corner roller assembly. The resultant drag force profile C' is shown in FIG. 9. As shown, the corner roller assembly did not have a transition point over the speed range from 0 to 150 ips, indicating that Lubricant C' has a transition point above 150 ips.

The data shown in FIG. 9 shows that Lubricant A' has a higher transition point ("TP") than Lubricant B', and Lubricant C' has an even higher transition point than Lubricant A'. This indicates that the principles of the present invention could be preferably implemented by the following lubricant pairs in order to reduce variation of tape tension and drag force with speed changes:

| Lubricant Pair | First Lubricant (Relatively low TP) | Second lubricant (Relatively high TP) |
| --- | --- | --- |
| 1 | B' | A' |
| 2 | B' | C' |
| 2 | A' | C' |

Figure 10:
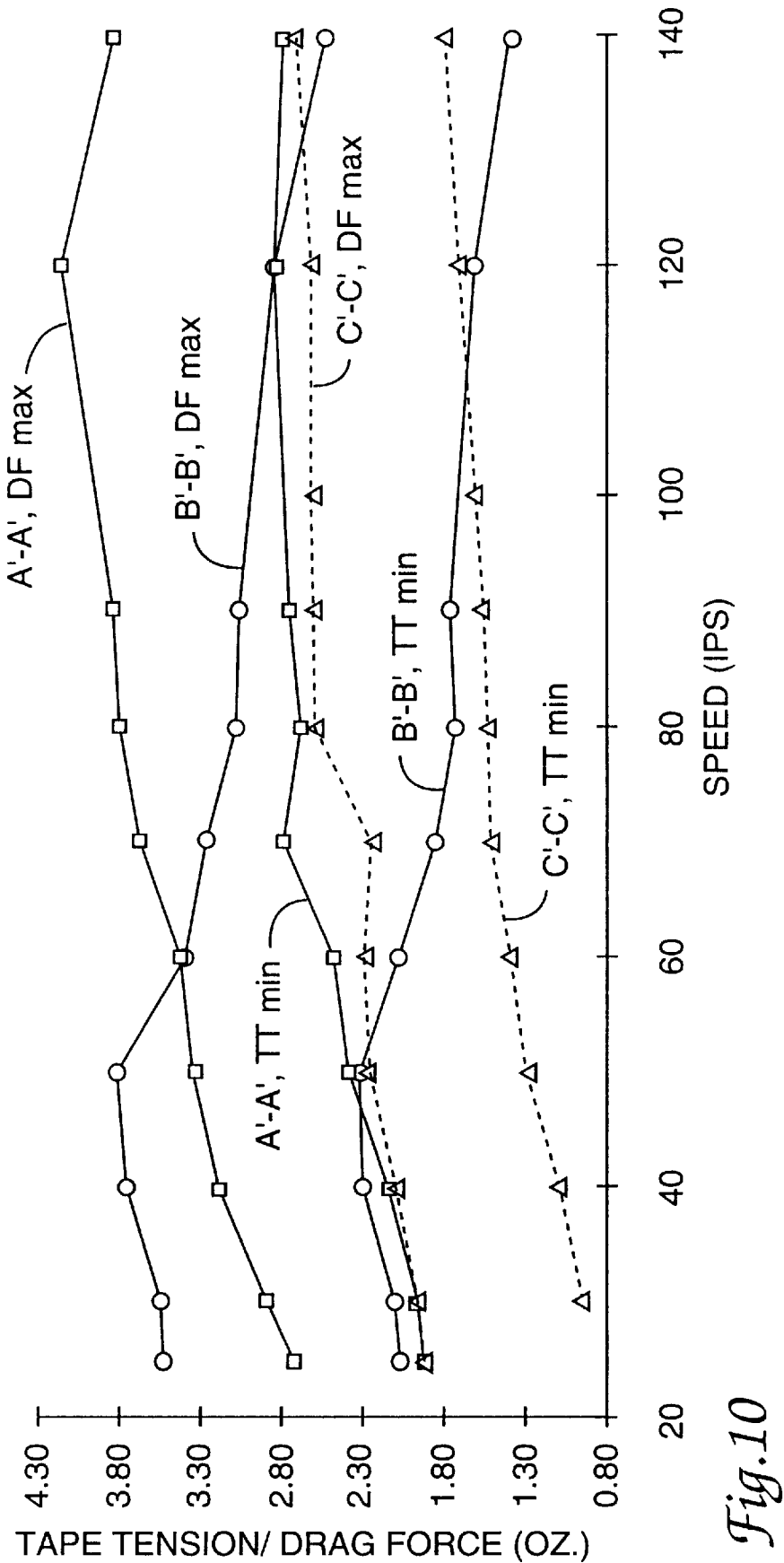
FIG. 10 shows tape tension and drive force profiles of three different data cartridges, each such cartridge including corner roller assemblies with identical drag force profiles.
Figure 11:
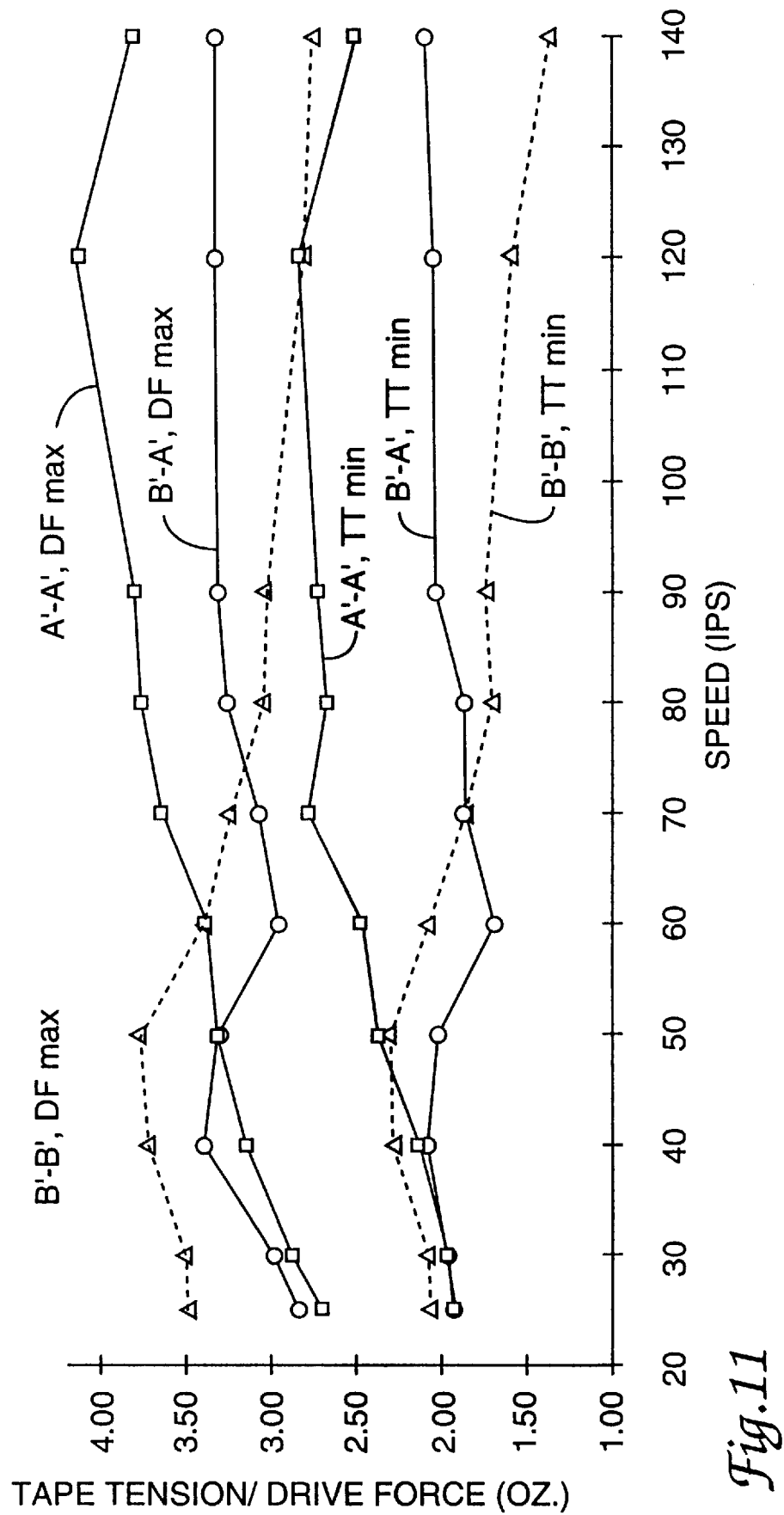
FIG. 11 is a graph comparing the tape tension and drive force profiles of a data cartridge having two different corner roller assemblies to two comparison data cartridges each containing identical corner roller assemblies.

Tape tension (TT) and drive force (DF) profiles of three 3.5 inch form factor belt-driven cartridges incorporating corner roller assemblies using identical first and second lubricant pairs, i.e., A'—A', B'—B', and C'—C' lubricant pairing, respectively, in each cartridge are shown in FIG. 10. These curves also suggest that it would be more advantageous to use differential pairing of lubricants as identified in the above table in order to reduce variation of tape tension and drag force with speed changes. Indeed, the profiles of FIG. 10 show that it would be particularly advantageous to put Lubricant B' in one corner roller assembly of a cartridge and either Lubricant A' or C' in the other corner roller assembly. To demonstrate such a benefit, FIG. 11 shows the improvement in stability of the tape tension and drive force profiles when the B'-A' pair is used in a 3.5 inch form factor cartridge as compared to the profiles when either an A'—A' or B'—B' pair is used in the same cartridge.

EXAMPLE 4

Figure 12:
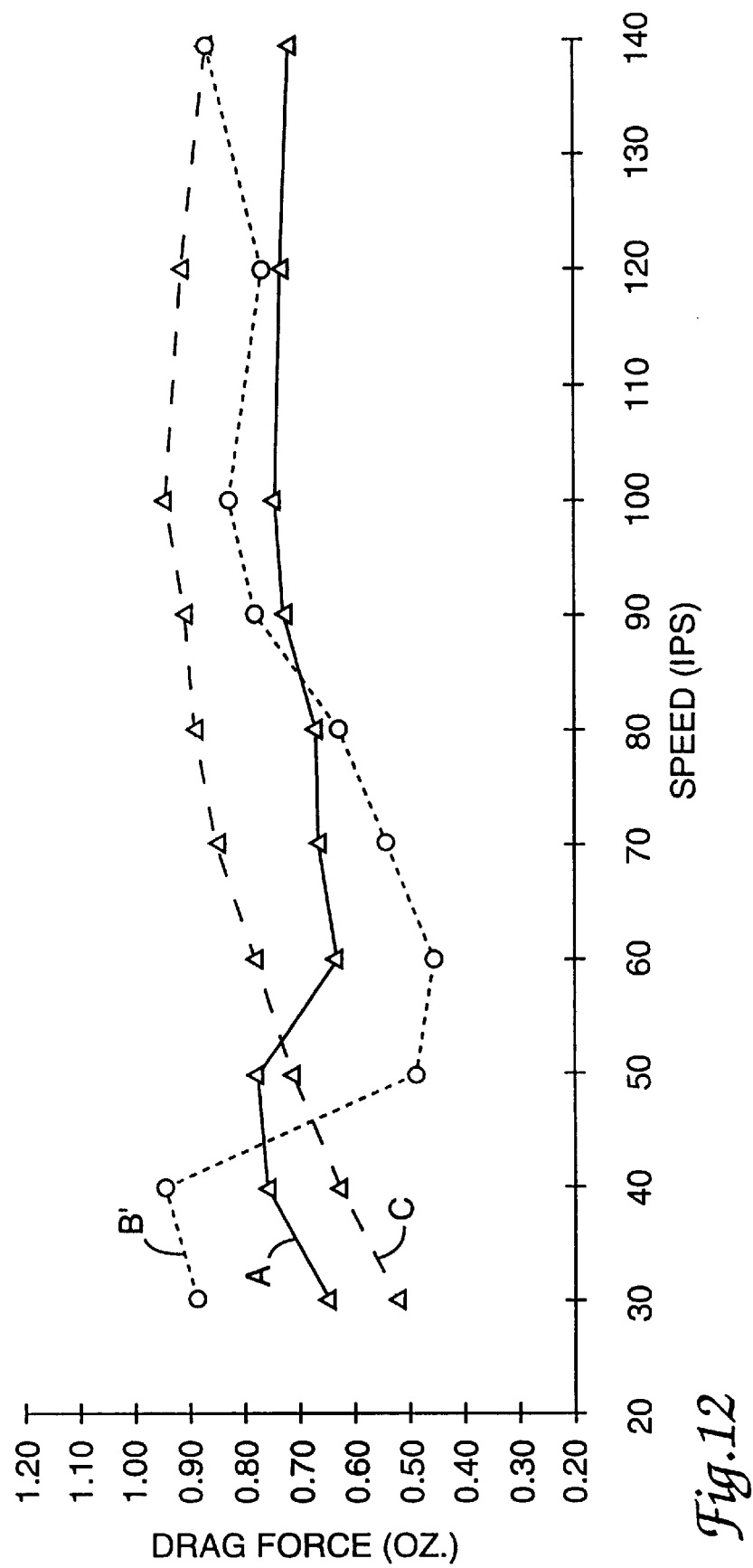
FIG. 12 is a graph showing the drag force profiles of three lubricants.

The drag force profiles for a corner roller assembly used in a Travan brand (Imation Corp.) form factor, belt-driven data cartridge were tested according to the drag force test described above using a side load of 22 oz. Lubricants A, B', and C were used as the lubricant for each test. The resultant profiles are shown in FIG. 12. As shown, the profiles for each of the corner roller assemblies incorporating lubricants A and B' showed a transition point at about 50 ips and about 40 ips, respectively. The profile for the corner roller assembly incorporating lubricant C showed no transition point up to 150 ips. This indicates that the principles of the present invention could be preferably implemented by the following lubricant pairs in order to reduce variation of tape tension and drag force with speed changes:

| Lubricant Pair | First Lubricant (Relatively low TP) | Second lubricant (Relatively high TP) |
| --- | --- | --- |
| 1 | B' | A |
| 2 | B' | C |
| 2 | A | C |

EXAMPLE 5

Figure 13A:
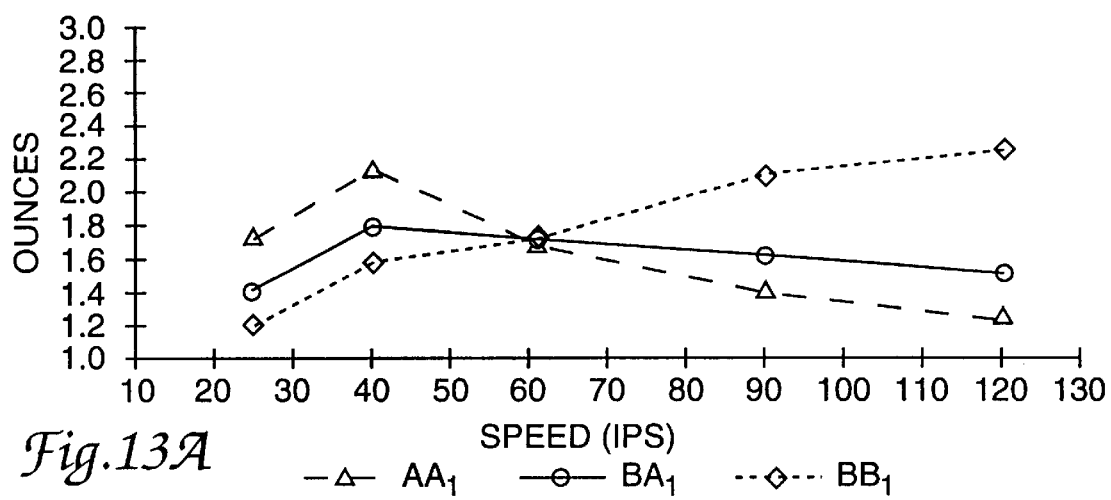
FIGS. 13A, 13B and 13C are graphs comparing the tape tension and drive force of a belt-driven cartridge containing two different corner roller assemblies in comparison to cartridges containing identical corner roller assemblies.
Figure 13B:
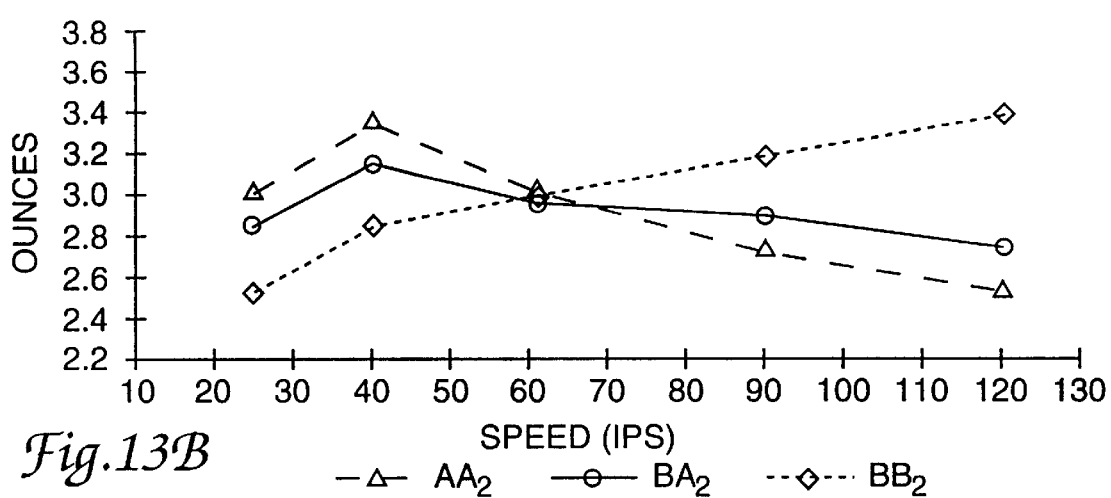
Figure 13C:
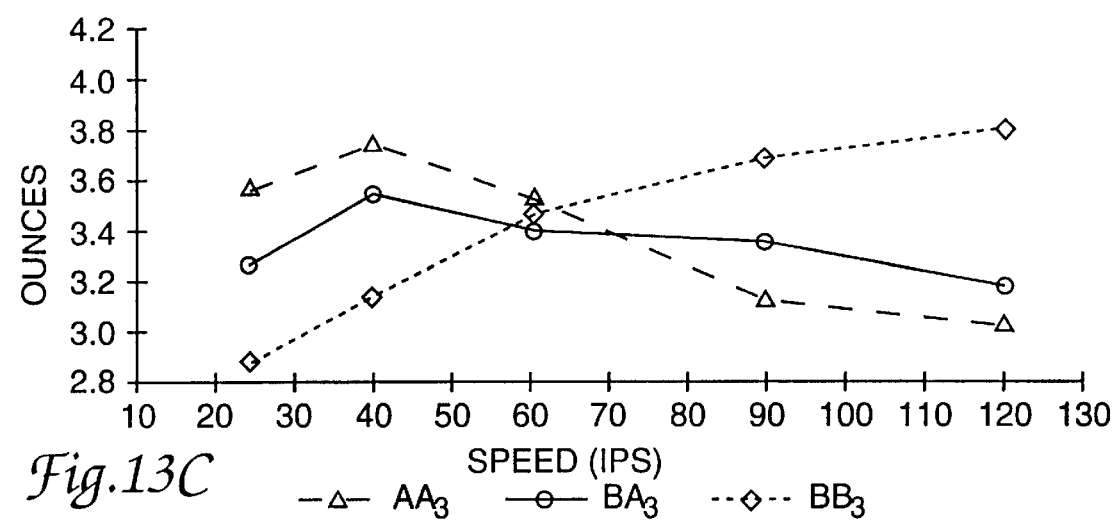

The tape tension and drive force characteristics of a corner roller assembly incorporating lubricant A were evaluated for performance in 8 belt-driven data cartridges For each of the 8 cartridges, the geometry of each corner roller assembly was identical and included a corner roller shaft having a diameter of 0.125 inches, a corner roller bore diameter of 0.127 inches, and a corner roller outer diameter of 0.430 inches measured at the crown of the corner roller peripheral wall. About 9 milligrams of Lubricant A was incorporated into each corner roller assembly. This was sufficient to fill about 70% of the volume between the shaft and the corner roller. Each cartridge was inserted into a magnetic recording drive adapted to monitor and record tape tension and drive force levels via computer control. Tape tension was monitored at the area where the tape contacted the transducer head. Each cartridge was tested at 5 speeds (25, 40, 60, 90 and 120 ips) in both the forward and reverse directions. From this data, minimum tape tension, maximum tape tension, and maximum drive force profiles corresponding to the forward direction were obtained by averaging the data for all 8 of the cartridges. FIGS. 13A, 13B, and 13C show the resultant profiles, identified in the Figures by the designations $AA_1$, $AA_2$, and $AA_3$, respectively. Note how the AA curves represent the use of two corner roller assemblies characterized by a relatively high transition point located proximal to the high speed portion of the intended tape speed range of the cartridge.

EXAMPLE 6

The procedure of Example 5 was repeated, except that Lubricant B was substituted for Lubricant A. FIGS. 13A, 13B, and 13C show the resultant profiles identified in the Figures by the designations $BB_1$, $BB_2$, and $BB_3$, respectively. Note how the BB curves represent the use of two corner roller assemblies characterized by a relatively low transition point located proximal to the low speed portion of the intended tape speed range of the cartridge. Please also note that the AA curves and BB curves are complementary across nearly the entire tape speed operating range. At low speeds, the low values of the AA curves are offset by the high values of the BB curves. Similarly, at high speeds, the high values of the AA curves are offset by the low values of the BB curves. In the middle speed range, the positive slope of the AA curves are offset by the negative slopes of the BB curves. This indicates that the principles of the present invention could be preferably implemented by using an B–A lubricant pair in a cartridge in order to reduce variation of tape tension and drag force with speed changes.

EXAMPLE 7

The procedure of Example 5 was repeated, except that each of the 8 cartridges included Lubricant A in one corner roller assembly and Lubricant B in the other corner roller assembly. FIGS. 13A, 13B, and 13C show the resultant profiles identified in the Figures by the designations $BA_1$, $BA_2$, and $BA_3$, respectively. Compared to the curves obtained in Examples 5 and 6 for the AA and BB lubricant pairs, the BA curves are best because the minimum tape tension is increased at low speed and is maintained at higher speeds; and because maximum tape tension and maximum drive force are both reduced. The curves for the BA lubricant pair also have flatter profiles. The flatter profiles result because of the ability of one type of lubricant to offset the extreme characteristics of the other. In effect, using two different lubricants having complementary profiles averages the results obtained when only one lubricant type is used in each cartridge. The result is a cartridge design which provides more uniform tape tension and drive force characteristics over a wider range of operating speeds.

EXAMPLE 8

The tape tension and drive force characteristics of 10 groups of belt-driven tape cartridges were tested using the following lubricant pairs:

| Cartridge Group | Left Corner Roller Lubricant | Right Corner Roller Lubricant |
| --- | --- | --- |
| 1 | D | D |
| 2 | B' | D |
| 3 | A' | D |
| 4 | A' | C' |
| 5 | A' | A' |
| 6 | B' | A' |
| 7 | C' | B' |
| 8 | C' | C' |
| 9 | C' | D |
| 10 | E | E |

Each cartridge group included 10 cartridges. To test each cartridge, the corner roller assemblies were lubricated with the appropriate lubricant. The cartridge was inserted into a magnetic recording drive adapted to monitor and record tape tension and drive force levels via computer control. Tape tension was monitored at the area where the tape contacted the transducer head. Each cartridge was tested at 5 speeds (25, 30, 60, 90 and 120 ips) in both the forward and reverse directions. From this data, minimum tape tension, maximum tape tension, and maximum drive force profiles corresponding to the forward direction were obtained for each group by averaging the data for all 10 of the cartridges in each group.

Groups 5, 8, and 10 showed the worst speed dependence. All were characterized by increasing tape tension and drive force with speed. Group 5 was the worst, because it had a maximum drive force out of industry proscribed specifications at 90 and 120 ips.

Groups 6 and 7 showed the most stable tape tension and drive force profiles. Both groups provided profiles that were fairly flat over all speeds. Group 7 maintained maximum drive force below 3.5 oz. at all speeds, and minimum tape tension was over 1.3 oz at all speeds. Maximum tape tension peaked at 2.8 oz at 30 ips. Group 6 showed maximum and minimum tape tension values that were about 0.25 oz. higher than Group 7. Also, Group 6 showed a maximum drive force about 0.50 oz higher than Group 7.

Interestingly, the Group 1 cartridges, which included a blend of the A and B' lubricants in each corner roller assembly, did not perform as well as the Group 6 cartridges, which included A in one corner roller assembly and B' in the other. In all instances, the Group 6 profiles for minimum tape tension and maximum drive force were substantially flatter than those for Group 1. In fact, in tests for maximum drive force conducted at room temperature, Group 1 showed greater variation in maximum drive force than any other group. Further, in tests for minimum tape tension at 5 C and maximum drive force at 5 C, Group 1 showed as much variation as any other.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A belt-driven, tape cartridge having a tape tension profile and being of the type comprising first and second corner roller assemblies for guiding the drive belt of the tape cartridge, wherein:
   (a) the first corner roller assembly has a first drag force profile and comprises:
      (i) a first shaft;
      (ii) a first rotating member comprising a first bore, wherein the first rotating member is rotatably mounted on the first shaft such that the first shaft is disposed in the first bore; and
      (iii) a first lubricant disposed in the first bore between the first rotating member and the first shaft;
   (b) the second corner roller assembly has a second drag force profile and comprises:
      (i) a second shaft;
      (ii) a second rotating member comprising a second bore, wherein the second rotating member is rotatably mounted on the second shaft such that the second shaft is disposed in the second bore; and
      (iii) a second lubricant disposed in the second bore between the second rotating member and the second shaft;

wherein the first and second corner roller assemblies are configured such that the drag force profile of the first corner roller assembly is preselected to be different than the drag force profile of the second corner roller assembly in order to controllably establish the tape tension of the cartridge and the first lubricant is different than the second lubricant.

2. The belt-driven tape cartridge of claim 1, wherein the first lubricant has a drag force profile which is characterized by a negative slope over at least a portion of a tape speed range of the first drag force profile and the second lubricant has a drag force profile which is characterized by a positive slope over a corresponding tape speed range portion of the second drag force profile.

3. The belt-driven tape cartridge of claim 1, wherein the first corner roller assembly has a relatively low transition point and the second corner roller assembly has a relatively high transition point such that the transition point of the first corner roller assembly occurs at a tape speed which is less than the speed for which the transition point of the second corner roller assembly occurs.

4. The belt-driven tape cartridge of claim 3, wherein the first corner roller assembly has a transition point which occurs at a tape speed of less than about 50 ips and the second corner roller assembly has a transition point which occurs at a tape speed equal to or greater than 50 ips.

5. The belt-driven tape cartridge of claim 4, wherein the second corner roller assembly has a transition point which occurs at a tape speed of greater than 60 ips.

6. The belt-driven tape cartridge of claim 4, wherein the second corner roller assembly has a transition point which occurs at a tape speed of greater than 70 ips.

7. The belt-driven tape cartridge of claim 1, wherein the drag force profile of the first corner roller assembly is complementary to at least a portion of the drag force profile of the second corner roller assembly.

8. The belt-driven tape cartridge of claim 7, wherein said portion of the drag force profile of the second corner roller assembly which is complementary to the drag force profile of the first corner roller assembly corresponds to a high tape speed portion of the drag force profile of the first corner roller assembly.

9. The belt-driven tape cartridge of claim 7, wherein said portion of the drag force profile of the second corner roller assembly which is complementary to the drag force profile of the first corner roller assembly corresponds to a middle tape speed portion of the drag force profile of the first corner roller assembly.

10. The belt-driven tape cartridge of claim 7, wherein said portion of the drag force profile of the second corner roller assembly which is complementary to the drag force profile of the first corner roller assembly corresponds to a low tape speed portion of the drag force profile of the first corner roller assembly.

11. The belt-driven tape cartridge of claim 1, wherein the drag force profile of the first corner roller assembly is complementary to at least a portion of the drag force profile of the second corner roller assembly, said portion comprising at least two of (i) a low tape speed portion of the drag force profile of the first corner roller assembly, (ii) a middle tape speed portion of the drag force profile of the first corner roller assembly, and (iii) a high tape speed portion of the drag force profile of the first corner roller assembly.

12. The belt-driven tape cartridge of claim 1, wherein the drag force profile of the first corner roller assembly is complementary to substantially all of the drag force profile of the second corner roller assembly.

13. The belt-driven tape cartridge of claim 1, wherein the first lubricant comprises a first perfluoropolyether base oil having a first molecular weight and the second lubricant comprises a second perfluoropolyether base oil having a second molecular weight wherein the ratio of the first molecular weight to the second molecular is in the range from 1.2:1 to 20:1.

14. The belt-driven tape cartridge of claim 13, wherein the ratio of the first molecular weight to the second molecular weight in the range from 1.2:1 to 2:1.

15. The belt-driven tape cartridge of claim 13, wherein the ratio of the first molecular weight to the second molecular weight is in the range from 1.2:1 to 5:1.

16. A method of providing a desired tape tension profile for a belt-driven data storage device comprising first and second corner roller assemblies for guiding a drive belt of the device, comprising the steps of:

(a) providing information representative of a plurality of drag force profile characteristics for a corresponding plurality of lubricants;

(b) using information comprising said information representative of the drag force profile characteristics in order to select a first lubricant capable of providing the first corner roller assembly with a first drag force profile and a second lubricant capable of providing the second corner roller assembly with a different, second drag force profile, said lubricants being selected in order to controllably establish the desired tape tension profile;

(c) providing the first lubricant in the first corner roller assembly; and (d) providing the second lubricant in the second corner roller assembly;

wherein the first lubricant is different than the second lubricant.

17. The method of claim 16, wherein said information representative of a plurality of drag force profile characteristics comprises molecular weight information for said plurality of lubricants.

18. The method of claim 16, wherein said information representative of a plurality of drag force profile characteristics comprises a plurality of drag force curves.

19. The method of claim 16, wherein the first corner roller assembly has a relatively low transition point and the second corner roller assembly has a relatively high transition point such that the transition point of the first corner roller assembly occurs at a tape speed which is less than the speed for which the transition point of the second corner roller assembly occurs.

20. The method of claim 16, wherein the first corner roller assembly has a transition point which occurs at a tape speed of less than about 50 ips and the second corner roller assembly has a transition point which occurs at a tape speed equal to or greater than 50 ips.

21. The method of claim 20, wherein the second corner roller assembly has a transition point which occurs at a tape speed of greater than 60 ips.

22. The method of claim 20, wherein the second corner roller assembly has a transition point which occurs at a tape speed of greater than 70 ips.

23. The method of claim 16, wherein the first lubricant has a drag force profile which is characterized by a negative slope over at least a portion of the tape speed range of the first drag force profile and the second lubricant has a drag force profile which is characterized by a positive slope over a corresponding tape speed range portion of the second drag force profile.

24. The method of claim 16, wherein the first lubricant comprises a first perfluoropolyether base oil having a first molecular weight and the second lubricant comprises a second perfluoropolyether base oil having a second molecular weight wherein the ratio of the first molecular weight to the second molecular is in the range from 1.2:1 to 20:1.

25. The method of claim 24, wherein the ratio of the first molecular weight to the second molecular weight is in the range from 1.2:1 to 5:1.

26. The method of claim 24, wherein the ratio of the first molecular weight to the second molecular weight in the range from 1.2:1 to 2:1.

* * * * *